(12) United States Patent
Hughes

(10) Patent No.: US 11,461,310 B2
(45) Date of Patent: Oct. 4, 2022

(54) DISTRIBUTED LEDGER TECHNOLOGY

(71) Applicant: RDX WORKS LTD, London (GB)

(72) Inventor: Daniel Patrick Hughes, London (GB)

(73) Assignee: RDX WORKS LTD, London (GB)

( * ) Notice: Subject to any disclaimer, the term of this patent is extended or adjusted under 35 U.S.C. 154(b) by 214 days.

(21) Appl. No.: 16/629,904

(22) PCT Filed: Jun. 19, 2018

(86) PCT No.: PCT/EP2018/066312
§ 371 (c)(1),
(2) Date: Jan. 9, 2020

(87) PCT Pub. No.: WO2019/015904
PCT Pub. Date: Jan. 24, 2019

(65) Prior Publication Data
US 2020/0272618 A1 Aug. 27, 2020

(30) Foreign Application Priority Data
Jul. 17, 2017 (EP) .................................. 17181756

(51) Int. Cl.
*G06F 7/00* (2006.01)
*G06F 17/00* (2019.01)
(Continued)

(52) U.S. Cl.
CPC ...... *G06F 16/2379* (2019.01); *G06F 16/2365* (2019.01); *G06Q 20/3678* (2013.01)

(58) Field of Classification Search
None
See application file for complete search history.

(56) References Cited

U.S. PATENT DOCUMENTS

2015/0371224 A1\* 12/2015 Lingappa ........... G06Q 20/3825
705/71
2016/0285969 A1\* 9/2016 Moore .................... G06F 9/485
(Continued)

FOREIGN PATENT DOCUMENTS

WO    WO 2017/109140 A1    6/2017

OTHER PUBLICATIONS

Cachin, et al., "Blockchain Consensus Protocols in the Wild," Arxiv.org, Cornell University Library, 201 Olin Library Cornwell University Ithaca, NY 14853, Jul. 6, 2017.
(Continued)

*Primary Examiner* — Tuan A Pham
(74) *Attorney, Agent, or Firm* — Hamilton, Brook, Smith & Reynolds, P.C.

(57) ABSTRACT

A computer-implemented method for performing by a node of a network of nodes for maintaining at least part of a distributed ledger maintained by the network of nodes is described. The method comprises maintaining at least part of the distributed ledger. The at least part of the distributed ledger is configured to store records and associated verification data for the records. The verification data for a record identifies: (i) a sequence of nodes in the network which received the intended record during a verification procedure; and (ii) the respective event state assigned by each node of the sequence of nodes to the intended record during the verification procedure.

6 Claims, 21 Drawing Sheets

(51) Int. Cl.
*G06F 16/23* (2019.01)
*G06Q 20/36* (2012.01)

(56) References Cited

U.S. PATENT DOCUMENTS

| | | | |
|---|---|---|---|
| 2016/0350749 A1* | 12/2016 | Wilkins | G06Q 40/04 |
| 2017/0075941 A1 | 3/2017 | Finlow-Bates | |
| 2017/0161734 A1* | 6/2017 | Bankston | G06Q 20/3829 |
| 2017/0236120 A1* | 8/2017 | Herlihy | G06F 21/57 |
| | | | 705/67 |

OTHER PUBLICATIONS

International Search Report and Written Opinion for International Application No. PCT/EP2018/066312, entitled "Distributed Ledger Technology," dated Sep. 11, 2018.
International Preliminary Report on Patentability for International Application No. PCT/EP2018/066312, entitled "Distributed Ledger Technology," dated Nov. 6, 2019.

* cited by examiner

| Record ID | Assigned Event State | Verification data | Record |
|---|---|---|---|
| #Email 1001# | 15 | Email 1001 verification data | Email 1001 Payload: Sender, Receiver, Send time, Email text, Attachments |
| | | | |
| | | | |
| | | | |
| | | | |
| | | | |

FIG 4

(Record ID, Sender node ID, Recipient node ID, Sender assigned event state, node count)

FIG 6

| Intended Record |
|---|
| Record |
| Verification coordinate |
| Coordinator node ID |

| Record ID | Assigned event state | Verification data | Record |
|---|---|---|---|
| #Artwork 9009# | 24 | Artwork 9009 verification data | Artwork 9009 Consumables data |
| | | | |
| | | | |
| | | | |
| | | | |

FIG 11

| Entry ID | Entity ID | Item ID | Status indicator: Entry consumed? |
|---|---|---|---|
| #0001 | A | Van Gogh 1 | No |
| #0002 | B | Rembrandt 1 | No |
| #0003 | C | Turner 1 | No |
| #0004 | D | Picasso 1 | Yes |
| #0005 | E | Picasso 1 | No |

FIG 12

| Entry ID | Entity ID | Item ID | Status indicator: Entry consumed? |
|---|---|---|---|
| #0001 | A | Van Gogh 1 | Yes |
| #0002 | B | Rembrandt 1 | No |
| #0003 | C | Turner 1 | No |
| #0004 | D | Picasso 1 | Yes |
| #0005 | E | Picasso 1 | No |
| #0006 | B | Van Gogh 1 | No |

FIG 13

| Entry ID | Entity ID | Currency amount | Status indicator: Entry consumed? |
|---|---|---|---|
| #0007 | G | 10 units | No |
| #0008 | H | 10 units | No |
| #0009 | I | 10 units | No |
| #0010 | J | 20 units | No |
| #0011 | K | 20 units | No |

Fig 22

| Entry ID | Entity ID | Currency amount | Status indicator: Entry consumed? |
|---|---|---|---|
| #0007 | G | 10 units | Yes |
| #0008 | H | 10 units | No |
| #0009 | I | 10 units | No |
| #0010 | J | 20 units | No |
| #0011 | K | 20 units | No |
| #0012 | G | 2 units | No |
| #0013 | H | 2 units | No |
| #0014 | I | 2 units | No |
| #0015 | J | 2 units | No |
| #0016 | K | 2 units | No |

Fig 23

DISTRIBUTED LEDGER TECHNOLOGY

This application is the U.S. National Stage of International Application No. PCT/EP2018/066312, filed Jun. 19, 2018, which designates the U.S., published in English, and claims priority under 35 U.S.C. § 119 or 365(c) to EP Application No. 17181756.2, filed Jul. 17, 2017. The entire teachings of the above applications are incorporated herein by reference.

TECHNICAL FIELD

The present disclosure relates to distributed ledger technology and, in particular, to computer-implemented methods for performing by a node of a network of nodes which maintain a distributed ledger as well as corresponding computer programs and computer nodes.

BACKGROUND

Distributed ledger technology is the technology used to maintain a distributed ledger (sometimes called a shared ledger). A distributed ledger is a replicated, shared, and synchronised collection of digital records spread across multiple computer nodes (or simply "nodes"), with nodes typically located across multiple sites, countries, or institutions.

A distributed ledger is typically maintained across a network of nodes, often a peer-to-peer network, the topology of which may vary depending on the requirements of application. A consensus mechanism is required to ensure that all nodes can agree on both legitimate and illegitimate activity and act accordingly.

In the case of illegitimate activity, this could be honest faults leading to incorrect operation of a node or a set of nodes, or malicious activity on the part of a node operator to profit or disrupt. As it is generally impossible to determine honest faults from malicious intent, most consensus mechanisms therefore assume that all faults are by cause of dishonest actors.

In many cases the consensus mechanism serves an additional purpose of allowing new nodes to verify that they are synchronizing correctly with existing nodes.

A distributed ledger in its purest form eliminates the need for a single central authority to maintain the integrity of the data stored in the ledger. Instead this task becomes the responsibility of the network as a whole, with the nodes of the network participating together to ensure overall integrity of the data.

All information in the ledger typically uses cryptography techniques to ensure consistency, integrity, security and permissions using cryptographic keys, encryption and digital signatures. Once data is committed and stored in the ledger it is considered as an immutable entry in the database of records which is governed by the rules of the consensus mechanism of the network.

While centralised ledgers are frequently affected by various forms of cyber-attacks, distributed ledgers are inherently much harder to mount a successful attack against because multiple distributed copies exist in many locations, all of which need to be attacked simultaneously in order to achieve a successful attack. The larger the network supporting a distributed ledger, the more expensive the attack becomes both logistically and in terms of resource requirements. Similarly, the records stored in a distributed ledger are resistant to malicious changes by a single party due to the consensus mechanism requiring all nodes to agree to any change, and the cryptographic proofs required to initiate any change.

Distributed ledgers (or "digital distributed ledgers" to make clear that the term relates to computer-stored data) can be considered as immutable, distributed databases storing a single version of the truth.

Distributed ledger technology has great potential to revolutionize the way organisations operate day to day in many industry verticals. For example, the technology can be used to assist governments with various administrative procedures such as tax collection, issuing licences, administrating social security benefits and voting procedures. The technology also has application in areas such as finance, provenance, music and entertainment, precious assets, the internet of things, and supply chains of various commodities. While distributed ledger technology has great potential, the incumbent distributed ledger architectures suffer from many technical problems and limitations.

One form of a distributed ledger architecture is a block chain. This is the technology that underlies the digital currency Bitcoin and was the first distributed ledger that enabled permissionless and trustless value transfer without a central controlling entity.

In this design, transactions are batched together and recorded at periodic intervals in blocks, which are appended to the last previous valid block to create a chain, hence the name block chain. Independent entities within the network referred to as "miners" perform the task of creating the blocks by collecting transactions from the network, batching them together, and attempting to find a hash value that meets the current requirements as defined by the network.

In Bitcoin, this process involves a miner attempting to discover a SHA-256 hash for the block that contains a number of leading zero bits as defined by a deterministic network requirement known as the "difficulty". If the current hash a miner has generated does not meet these requirements, he can increment a "nonce" value and try again. If the miner has not found an acceptable hash after a number of nonce increments (in Bitcoin the nonce is a 32 bit value), they can replace some transactions in the block, reset the nonce value and start again. The chances of an individual miner discovering a hash that meets these requirements reduces as more miners join the network and the difficulty increases.

This process is known as "proof of work" as discovering a valid hash for a block requires a significant amount of effort, yet it is trivial for anyone to verify that a hash is valid given the block contents and the nonce value.

Once a miner has discovered a valid block hash, they submit it to the network in the hope that no other miner has generated a competing block hash with more leading zero bits then theirs in the same interval. If not, then their block will be appended to the end of the chain and all miners will then reset and attempt to discover a valid hash for the next block.

The consensus rules of proof of work are simple: in each interval, the block with the hash containing the most leading zero bits is the one which is accepted by the network, therefore the accepted block chain is the one with the most cumulative work across all blocks.

Miners are rewarded for their work by being awarded a number of Bitcoins for successfully generating a block and also collect the fees for the transactions included in the block. The award of new Bitcoins for block generation also acts as an economic mechanism for issuing and distributing new currency units.

Bitcoin is but one example of how a distributed ledger is used to record events and facilitate transfer of ownership without a central entity, of which there are now many. While many use differing consensus mechanisms, hashing algorithms, economic parameters and block intervals along with the development of a multitude of new features, nearly all employ a similar block chain based architecture and thus inherit many, if not all, of its limitations. Some distributed ledger architecture such as Ripple and a Directed Acyclic Graph (DAG) are not block chain based, but suffer from various problems similar to those described here in detail for block chain.

Perhaps the most critical of these is the lack of scalability possible with such an architecture. Being vertical in nature, all nodes and miners within the network need to receive a copy of all blocks, past, present and future, in order to be in synchronization with a global state and operate correctly.

Currently the size of a Bitcoin block is 1 MB, and is sufficient to process 3-5 transactions per second without issue. However, as the block size increases to facilitate higher transactional throughput, the propagation time of a block to all nodes in the network also increases. Eventually this propagation time is longer than the interval, 10 minutes for Bitcoin, in which blocks are created. Miners do not receive the latest blocks in a timely manner and so create new blocks based on old knowledge. The network becomes saturated with blocks that are competing with each other and network throughput drops drastically. At this point, increasing the block size further only exaggerates the problem due to CAP theorem and data transmission limits due to speed of light limitations. "CAP" stands for Consistency, Availability and Partition tolerance.

This saturation point has been calculated to begin at around 400-500 transactions per second and to become critical at 800-1000 transactions per second, or at block sizes of 125 MB to 250 MB respectively. For comparison, global debit and credit card payments average in the region of 3000-5000 transactions per second, with peaks in the 10,000s and would require blocks Gigabytes in size.

Further adding to the scalability issues is the requirement that miners need as much knowledge about current pending transactions in the network as possible in order to create blocks efficiently. Transactions are broadcast around the network individually to all nodes prior to being included in a block, which results in transactions being broadcast twice, once when created, and again when included within a block. This further consumes available network bandwidth and increases overall block propagation time.

Another pressing issue is the resource consumption of the consensus mechanisms. Most distributed ledgers utilize some form of resource consumption to drive the consensus mechanism. The most popular is proof of work, the resource consumed being computing power by calculating hashes in order to discover a valid block hash, which in turn consumes electricity. Presently Bitcoin has been calculated to be consuming around 10 GW of electricity to perform its consensus, with Ethereum not far behind, with consumption increasing as these networks grow and competition between miners intensifies. There is also no correlation between the amount of resources consumed to provide consensus with the throughput capacity of the network.

Other consensus mechanisms include proof-of-stake, proof-of-activity, proof-of-burn, proof-of-capacity, and proof-of-elapsed-time. Each has been criticised. For example, in proof-of-stake there is little incentive to act well (the "nothing-at-stake" problem). Proof-of-activity suffers from the same problem, and is also computationally intense like proof-of-work. Proof-of-burn requires the destruction of value and is financially expensive. Proof-of-capacity suffers from the nothing-at-stake problem and requires vast amounts of storage resources. Proof-of-elapsed-time has potential issues with trust.

Secondary consumption is also a factor as the act of mining requires large amounts of hardware to perform the task and to stay competitive, which itself wears out over time, becomes unserviceable and is then a waste product.

Another concerning issue is the tendency of current distributed ledger technologies to centralize over time, especially when operating in a public environment. This centralization is a two-fold issue, and is a consequence of both the consensus mechanisms currently employed and the lack of incentive for nodes in the network to keep a copy of the ledger.

Centralization due to the consensus mechanism revolves around the fact that they are resource based and employ a rising difficulty parameter as competition between miners increases. As this difficult parameter increases, it becomes more expensive to take part in the mining process and be profitable. Miners with smaller operations, or limited capital to buy the resources they need, halt their operations as they can no longer compete. This ultimately leads to a small number of very large mining operations, which compromises general security, reduces the attack surface, and makes collusion and abuse between these miners much easier.

The second centralization effect concerns the nodes that keep a copy of the full ledger present in the network. Due to the vertical architecture of block chains, and the fact that all blocks are required to ensure a correct global state, the amount of storage space needed to store a full copy is forever increasing in size. These "full nodes" are also the main data providers to new nodes that join the network who wish to synchronize, which places an additional requirement upon them for fast internet connections. Full nodes are not rewarded in any way for providing this critical and necessary function, yet there is a significant cost associated with operating one. As these costs increase, the operators of these full nodes may decide to halt providing this critical service as it is purely voluntary. This may again lead to a small number of entities controlling the majority of these nodes, therefore compromising general security, reducing the attack surface, and enabling possible collusion and abuse.

A further disadvantage of block chain is that, in order to retrieve information regarding past events, for example to obtain an entity's balance, one must access and scan the entire block chain. This takes a long time and makes real time transactions, for example retrieval of money from cashpoints, problematic. Technical solutions exist that can mitigate this problem to a degree, such as smart caching of frequently accessed information to memory, but ultimately these solutions only push the issue to another area over the long term (there will be large memory requirements to store the cache) as the block chain continues to grow in size.

Ethereum is an open-source, public, block chain based distributed computing platform similar to Bitcoin but with the inclusion of a feature allowing turning complete logic (scripting) to be executed upon various actions. These scripts are known as smart contracts and allow developers to create markets, store registries of debts or promises, move funds in accordance with instructions given long in the past (like a will or a futures contract) and provides a platform for development of other decentralised applications. Ethereum provides a digital currency token called "ether", which can be transferred between accounts and used to compensate participant nodes for computations performed. Ethereum's transactional throughput is similar to Bitcoin's and suffers from the same saturation effect in much the same manner.

It would be advantageous to provide distributed ledger technology or architecture which addresses one or more of the above-described problems. In particular, it would be advantageous to provide distributed ledger technology or architecture which is scalable for use in a wide range of applications. For example, as far as digital currency transactions are concerned, it would be advantageous to provide improved transaction throughput and reduced settlement times from those of the current technology or architectures. It would also be advantageous to provide an improved consensus mechanism or, in more general terms, an improved verification mechanism, that does not centralize over time, nor consume large amounts of resources.

SUMMARY

Aspects and features of the present disclosure are set forth below. The nature of this particular disclosure is that there are multiple aspects, each performed by a node (or "computer node", the terms being used interchangeably herein) of a network of nodes. Although not necessary, it is possible for a node to perform one or more or all of the aspects set forth below. Accordingly, features from one aspect may be introduced into another in any combination.

The present disclosure provides an improved digital ledger technology or architecture that is based on co-operation rather than competition. Rather than the resource-intensive competition of the block chain approach, the present disclosure teaches a ledger/architecture in which nodes in the network work together to perform a verification procedure on a received record intended for the distributed ledger before the record is committed to the ledger. The record is sent between nodes as part of an intended record comprising the record. The record can comprise any record data, with the record and record data being application-specific. Once records are committed to or stored in the ledger the records can be queried to determine the temporal ordering of the records (i.e. the relative order in which the records were received). Records can also be subsequently verified to confirm the relative ordering. An individual record can be verified using a verification record which is generated by the verification procedure and stored in the ledger.

Certain aspects of the present disclosure involve a distributed ledger being maintained by a network of nodes. Nodes of the network maintain a local copy of the ledger (or part of the ledger). A verification procedure is used in which an intended record comprising a record intended for the ledger is passed along a sequence of nodes. Each node of the sequence of nodes assigns a respective or local event state to the intended record and, on committing the record of the intended record to the ledger, nodes in the sequence of nodes store verification data for the record. The verification data for a record identifies: (i) the sequence of nodes in the network which received the intended record during the verification procedure; and (ii) the respective event state assigned by each node of the sequence of nodes to the intended record during the verification procedure.

According to an aspect, there is provided a computer-implemented method for performing by a node of a network of nodes for maintaining at least part of a distributed ledger maintained by the network of nodes, the method comprising assigning, during a verification procedure, an event state to a received intended record, wherein the intended record comprises a record intended for the distributed ledger. The intended record undergoes the verification procedure before being committed to a local copy of at least part of the ledger maintained by the node.

The event state for a node at a given time may be considered a local event state for that node. Typically, each node in the network will update its event state for each intended record received by the node.

A node may update its event state: (i) upon receipt of an intended record or (ii) at the end of the part of the verification procedure that the node performs or (iii) at any time in between these times.

The local event state may be provided by a logical clock for the respective node, such as a Lamport clock, Vector clock, Matrix clock or any other logical clock or counter operable to produce partial or total ordering when updating its local event state. Updating a local event state may comprise incrementing a logical clock value. Optionally, the local event state may be updated based on receipt of an intended record. The intended records will then be processed in order received. Optionally, the local event state may be assigned to a received intended record and the local event state may be updated after the intended record has been processed (then the next local event state will be assigned to the next intended record). If multiple intended records are being processed at the same time other ways of assigning local event states may be used. Typically, the node provides each intended record received with a corresponding or associated event state.

Records that have already been processed and stored to the copy of the ledger of one node may be sent to other nodes via updates for example using a gossip protocol. Upon receipt of a record through an update, the recipient node may update its local event state and store the record in its copy of the ledger. The copy of the ledger of any node may be a partial copy. That is, the local copy of the ledger may be at least part of the ledger.

The event state assigned to the intended record advantageously may be used in a verification procedure for the record of the intended record in which the intended record is passed along the nodes of a sequence of nodes and in which each node of the sequence of nodes assigns a respective event state to the intended record. The node may also be configured to maintain at least part of the distributed ledger. The distributed ledger (or part of the ledger) is configured to store records and associated verification data for the records. The verification data for a record stored in the distributed ledger identifies: (i) a sequence of nodes in the network which received the intended record during a verification procedure (when the intended record comprising a record intended for the distributed ledger was sent along the sequence of nodes); and (ii) the respective event state assigned by each node of the sequence of nodes to the intended record during the verification procedure.

Other nodes in the network, in particular the nodes in the sequence of nodes, may also be configured to maintain at least part of the ledger. Each of the nodes in the sequence of nodes may be configured to store the record and the associated verification data. Advantageously, the same record and verification data should be stored in the parts of the distributed ledger maintained by the nodes of the sequence of nodes. That is, the same records should be replicated in the copies of the ledger stored at multiple nodes in the network. As the verification data should contain a record of the sequence of nodes and their respective assigned event states, the ledgers of any nodes that attempt to change the record or verification data (e.g. through malfunction or malicious activity) will no longer match the copies of the ledger of the rest of the network. Verification data stored at the nodes in the sequence and the nodes in the sequence will be able to verify the record and detect the malfunctioning or malicious node.

To ensure that verification of a record can be sufficiently performed by any network node, it is advantageous that as many event states are included in the verification data as possible without compromising efficiency. Efficiency is mainly influenced by network size, and there exists for any sized network lower and upper bounds within which efficiency is at its peak. For implementations using a gossip protocol, using log(n)*3 event states in the verification data, where n is the number of nodes in the network, is efficient. For implementations not using a gossip protocol, (n/3)+1 event states in the verification data is efficient. Efficiency is a trade-off between consensus performance and conflict resolution and these numbers can be modified depending on the application requirements.

The verification procedure may be considered to implement at least part of a verification mechanism. The verification procedure may be considered as a consensus procedure which, in turn, may be considered to implement at least part of a consensus mechanism. The verification data may be considered as consensus data.

The sequence of nodes may be considered as an event path or an ordered subset of nodes.

According to another aspect, there is provided a computer-implemented method for performing by a node of a network of nodes for maintaining at least part of a distributed ledger maintained by the network of nodes, the method comprising: maintaining at least part of the distributed ledger, wherein the at least part of the distributed ledger is configured to store records and associated verification data for the records, wherein the verification data for a record identifies: (i) a sequence of nodes in the network which received the intended record during a verification procedure (in which the intended record was passed along the nodes of the sequence of nodes and in which each node of the sequence of nodes assigned a respective event state to the intended record); and (ii) the respective event state assigned by each node of the sequence of nodes to the intended record during the verification procedure.

In the verification procedure the record was processed as part of an intended record comprising the record which, at that stage, was intended for the distributed ledger. That is, the record has a corresponding intended record which had the event states assigned to it during the verification procedure.

The distributed ledger (or the at least part of the ledger as the case may be) may also be configured to store associated record identifiers for the records. A record identifier may be a hash of the record. In other words, it may be a hash value calculated by hashing the data of the record. The distributed ledger (or the at least part of the ledger as the case may be) stored by a node may be configured to store associated with the record the local event states of when the node first received the intended record.

Each node of at least a subset of the nodes of the sequence of nodes may perform a check of the record of the intended record during the verification procedure. The checking may be used to confirm that the node consents to the inclusion of the record in the distributed ledger. The checking may comprise checking the record of the intended record for compliance with one or more defined criteria. For example, the checking may be to check for format, the contents of the payload, encryption properties or any other defined criteria. If the check fails for an intended record, the intended record will be rejected and the node may not assign an event state to the intended record. That is, the node may only assign an event state to an intended record that it confirms passes the check.

Another aspect provides a computer-implemented method for performing by a node of a network of nodes for maintaining at least part of a distributed ledger maintained by the network of nodes, the method comprising: storing, in the at least part of the distributed ledger maintained by the node, a record of an intended record and verification data associated with the record, wherein the verification data identifies: (i) a sequence of nodes in the network which received the intended record during a verification procedure; and (ii) the respective event state assigned by each node of the sequence of nodes to the intended record during the verification procedure.

Yet another aspect provides a computer-implemented method for processing an intended record for a distributed ledger which is maintained by a network of nodes, the intended record comprising a record intended for the distributed ledger, the method comprising: initiating a verification procedure for an intended record, wherein the verification procedure comprises the intended record being sent to a sequence of nodes of the network, wherein each node of the sequence of nodes assigns a respective event state to each received intended record during the verification procedure.

As well as comprising the record intended for the ledger, the intended record may comprise at least one verification element for use in the verification procedure. The at least one verification element comprises, at least, a verification element identifying the respective event state assigned by the current node to the intended record. The at least one verification element may also comprise an identifier for the current node in the sequence. The at least one verification element may also comprise an identifier for the next node in the sequence. One or more data structures (e.g. one or more verification coordinates) comprising the at least one verification element may be provided. Each data structure or coordinate may comprise verification elements comprising the respective event state assigned by the current node for the intended record, an identifier for the current node in the sequence, and an identifier for the next node in the sequence. The data structure(s) may also comprise an identifier for the record. The data structure(s) may be updated as the intended record is passed along the sequence of nodes during the verification procedure to include at least one verification element for the current node. The at least one verification element comprises, at least one verification element identifying the respective event state assigned by the current node to the intended record. The updating may include updating the at least one verification elements already described. The updating may be achieved by replacing the verification elements in a data structure or by adding a data structure for each node in the sequence of nodes as the intended record is passed along the sequence.

The method may further comprise receiving a record and conditional on (based on) receiving the record, constructing an intended record comprising the record and initiating the verification procedure.

The method may be performed by a coordinator node for the verification procedure. The sequence of nodes will typically comprise the coordinator node. The coordinator node may be the first node in the sequence of nodes, although it could be another node in the sequence. For example, one node may initiate the sequence and the second node in the sequence may act as the coordinator node.

Optionally, the method further comprises: receiving data which identifies the sequence of nodes in the network and the respective event states assigned by each node of the sequence of nodes to the intended record during the verification procedure; constructing verification data which identifies: (i) the sequence of nodes in the network which received the intended record during the verification procedure; and (ii) the respective event state assigned by each node of the sequence of nodes to the intended record during the verification procedure; and transmitting the verification data. The method may further comprise transmitting a commit instruction which instructs the nodes in the sequence of nodes to store (or persist) the record of the intended record in the distributed ledger. The transmitting the commit instruction may comprise the transmitting the verification data. The data which identifies the sequence of nodes and the respective event states may be received in a data structure comprising the respective verification elements from each node in the sequence of nodes. The verification data can be constructed from the verification elements from the data structures. The verification data may comprise an aggregated set of data structures, one data structure for each node in the sequence of nodes.

According to another aspect, there is provided a computer-implemented method for performing by a node of a network of nodes, wherein the network of nodes maintains a distributed ledger, the method comprising: receiving an intended record for the distributed ledger, wherein the intended record comprises a record intended for the distributed ledger; assigning an event state to the intended record; and transmitting the event state for the intended record. The event state may be transmitted to a coordinator node, either directly or indirectly via other nodes in the network. The event state may be transmitted to the previous node or all previous nodes in the sequence. The method may comprise updating the data structure(s) in the intended record with at least one verification element for the node. The transmitting of the event state may comprise transmitting a data structure comprising at least one verification element for the node (e.g. the assigned event state, the current node identifier, the next node identifier and the record identifier).

The record may have an identifier. The method may comprise storing the record and the identifier, for example in a pending list, so that the record can be identified later, in particular to store (or persist) its record to the ledger.

Typically, each node in the sequence of nodes will perform this method. It is not essential that the node perform any checking. For example, the distributed ledger may be used to store simple records such as emails, with no checking being required. Such a ledger would enable the records to be verified using the verification data.

The method may comprise checking the record of the intended record to confirm whether or not the node consents (i.e. does not object) to the inclusion of the record in the distributed ledger; conditional on the node consenting to the inclusion of the record in the distributed ledger, and transmitting the respective event state for the intended record. The method may further comprise transmitting a consent indicator, wherein the transmitting the consent indicator may comprise the transmitting the respective event state for the intended record. The method may also comprise, conditional on the node not consenting to the inclusion of the record in the distributed ledger, transmitting a non-consent indicator.

The transmitting may be to a coordinator node, either directly or indirectly via other nodes in the network. The consent indicator may comprise an identifier for the intended record, an identifier for the node, the event state of the node for the intended record. It may also comprise an identifier of the next node in the sequence. It may be transmitted as a single coordinate or array. The transmitting of the consent indicator may comprise transmitting a data structure comprising verification elements for the node (the assigned event state, the current node identifier, the next node identifier and the record identifier).

A coordinator node is not essential. Instead, for example, the verification data may be constructed as the intended record is passed along the sequence of nodes and the transmitting may then be to the previous node in the sequence or to all previous nodes in the sequence.

If the coordinator node receives a non-consent indicator, it does not transmit the verification data for the intended record and the nodes will not store (or persist) the record of the intended record. The coordinator node may transmit a non-commit instruction and/or the storing of the record may be timed out at each node.

If a previous node in the sequence receives a non-consent indicator, the node will not store (or persist) the record and it will send the non-consent indicator to the previous node in the sequence, and so on. The node which transmits the non-commit instruction may transmit it to all previous nodes in the sequence for each node to not store (or persist) the record.

The check may comprise a check for one or more defined criteria.

The method may further comprise sending the intended record to a further node in the network, wherein the further node becomes the next node in the sequence of nodes. The method may comprise receiving an indicator to confirm that the further node will participate in the verification procedure. The method may comprise receiving an indicator that the further node will not participate in the verification procedure, for example if it is not storing a copy of the ledger. In this case, the method may comprise, in response to receiving the indicator, sending the intended record to a different further node in the network, wherein the different further node becomes the next node in the sequence of nodes. A similar process may be used if no indicator to confirm that the further node will participate in the verification procedure is received within a predetermined time.

Another aspect provides a computer-implemented method for performing by a node of a network of nodes for storing a record in at least part of a distributed ledger maintained by the network of nodes, the method comprising: receiving verification data for an intended record, wherein the verification data identifies: (i) a sequence of nodes in the network which received the intended record during a verification procedure; and (ii) the respective event state assigned by each node of the sequence of nodes to the intended record during the verification procedure; storing the record of the intended record and the verification data for the record in the at least part of the distributed ledger maintained by the node. The verification data may comprise an aggregated set of data structures, one data structure for each node in the sequence of nodes. Each data structure comprises the verification elements, including the event state, assigned by the respective node during the verification procedure.

The verification data may have been sent from a coordinator node along with a commit instruction (which may be an implicit commit instruction). The verification data may be received with an identifier for the intended record.

Each node of at least a subset of the nodes of the sequence of nodes may have performed a check of the record of the intended record during the verification procedure. The check may have been used to confirm that the node consents to the inclusion of the record in the distributed ledger.

The distributed ledger may comprise records, wherein each of a plurality of the records consumes a respective association of a respective item with a respective entity.

A consumable association is an association that can be consumed or used up in some way. Non-limiting examples of association that can be used up relate to an association associating an entity (e.g. a person, business, legal entity, place or thing) with a particular item (which can include an object or role). The association, for example ownership or allocation of an object or formal assignment of a role could be changed to another entity and would no longer be associated with the former entity. In other words, the association that formerly associated an entity with that particular item, would have been used up or consumed. Importantly, for example if the item was a physical entity being sold or an amount of digital currency it is important that the same consumable association is not consumed or spent more than once.

Consumable associations enable the system to be used for a wide variety of purposes, such as recording financial transactions and associated account balances, recording transfers of ownership of items including property, responsibilities, roles etc.

Another aspect provides a computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising: receiving an intended record, wherein the intended record comprises a record intended for the distributed ledger, wherein the record consumes a particular association of a particular item with a particular entity; checking the at least part of the distributed ledger maintained by the node to determine whether or not the particular association has already been consumed by another record in the ledger; and conditional on the node determining that the particular association has not been consumed by another record in the ledger, transmitting an event state assigned by the node for the intended record. Conditional on the node determining a conflict, the method may further comprise transmitting a non-consent indicator.

The transmitting may be to a coordinator node, either directly or indirectly via other nodes in the network. The transmitting may be to the previous node or all previous nodes in the sequence. The transmitting may be to a next node in the sequence. The consent indicator may comprise an identifier for the intended record, an identifier for the node and/or the event state of the node for the intended record. It may also comprise an identifier of the next node in the sequence. It may be transmitted as a single coordinate or array. The transmitting of the consent indicator may comprise transmitting a data structure comprising verification elements for the node (e.g. the assigned event state, the current node identifier, the next node identifier and the record identifier).

If the coordinator node receives a non-consent indicator, it does not transmit the verification data for the intended record and the nodes will not store (or persist) the record of the intended record. The coordinator node may transmit a non-commit instruction and/or the storing of the record may be timed out at each node.

If a previous node in the sequence receives a non-consent indicator, the node will not store (or persist) the record and it may send the non-consent indicator to the previous node in the sequence, and so on. The node which transmits the non-commit instruction may transmit it to all previous nodes in the sequence instructing each node to not store (or persist) the record.

Another aspect provides a computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising: receiving a first intended record for the distributed ledger, wherein the first intended record comprises a record intended for the distributed ledger, wherein the record consumes a particular association of a particular item with a particular entity, receiving a second intended record for the distributed ledger, wherein the second intended record comprises a record intended for the distributed ledger, wherein the record consumes a particular association of a particular item with a particular entity; determining whether or not there is a conflict between the first intended record and the second intended record, a conflict comprising the first intended record and the second intended record each consuming the same particular association; and conditional on determining a conflict, rejecting at least one of the first intended record and the second intended record.

The rejecting may comprise transmitting a non-consent indicator for at least one of the first and second intended record. The non-consent indicator typically comprises an identifier for the intended record or for the record and an indicator that its inclusion in the ledger is not consented to i.e. for which a conflict has been identified.

The determining may comprise comparing an association (a consumable association) consumed by the first intended record with an association (a consumable association) consumed by the second intended record and determining that they are the same association. Each record may comprise consumables data identifying a consumable entry. A consumable entry identifies an association between an entity and an item. That is, the consumable associations may comprise or be represented by consumable entries. The consumable entries may have an identifier. The determining may comprise comparing the identifiers. The consumable entry identifier may be a hash of some or all of the data in the consumable entry, and may be a hash of an identifier for the entity and an identifier for the item.

The consumables data may also comprise data for creating a new association between the item and one or more new entities. This data may comprise an identifier for a new entity. The data may comprise one or more identifiers for one or more corresponding new entities and may comprise data identifying the item. In instances where an item owned by one entity is split into more than one new item, for digital currencies, for example, the data may comprise all of the data needed to create the new items such as the amount of currency being transferred to each entity. In other words the consumables data can comprise data to consume one or more consumable entries already in the ledger and data to create one or more new consumable entries.

A record may simply consume one or more consumable associations e.g. a one-time use only digital coupon or token associated with an entity. Additionally or alternatively, a record may create one or more new consumable associations e.g. when the record comprises a payment in a digital currency. The newly created consumable association may relate to the same item, and the record may therefore transfer the association of a respective item from a respective entity to other respective entity.

The non-consent indicator may be transmitted to a coordinator node. The non-consent indicator may be transmitted to the previous node or all previous nodes in the sequence. A non-consent indicator for only one of the first intended record and the second intended record may be transmitted. The record with the earliest causal event state will typically be the one for which the consent indicator is transmitted, consequently the record with the later causal event state will typically be the one for which the non-consent indicator is transmitted.

If the coordinator node receives a non-consent indicator, it does not transmit the verification data for the intended record and the nodes will not store (or persist) the record of the intended record. The coordinator node may transmit a non-commit instruction and/or the storing of the record may be timed out at each node.

If a previous node in the sequence receives a non-consent indicator, the node will not store (or persist) the record and it may send the non-consent indicator to the previous node in the sequence, and so on. The node which transmits the non-commit instruction may transmit it to all previous nodes in the sequence for each node to not store (or persist) the record.

Another aspect provides a computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising: receiving, from another node in the network, a record and verification data for the record, wherein the record consumes a particular association of a particular item with a particular entity, wherein the verification data for the record identifies: (i) a sequence of nodes in the network which received the intended record during a verification procedure; and (ii) the respective event state assigned by each node of the sequence of nodes to the intended record during the verification procedure; determining whether or not there is a conflict, a conflict existing when the particular association that has been consumed by the record is the same particular association as that consumed by a different record in the at least part of the distributed ledger maintained by the node; conditional on there being a conflict, determining, from the event states of the verification data associated with records, the record which was first to consume the particular association and the record which was second to consume the association; and updating the distributed ledger to store the record which was first to consume the particular association and to reject the record which was second to consume the particular association.

Another aspect provides a computer-implemented method for performing by a first node of a network of nodes, wherein the network of nodes maintains a distributed ledger, wherein the distributed ledger comprises records, wherein each of a plurality of the records consumes a respective association of a respective item with a respective entity, the method comprising: receiving, as part of a first verification procedure in which the sequence of nodes includes the first node, a first intended record, wherein the first intended record comprises a first record intended for the distributed ledger, wherein the first record consumes a particular association of a particular item with a particular entity; receiving from a second node, wherein a second verification procedure is being performed in which the sequence of nodes includes the second node but not the first node, a second intended record, wherein the second intended record comprises a second record intended for the distributed ledger, wherein the second record consumes a particular association of a particular item with a particular entity; determining whether or not there is a conflict between the first intended record and the second intended record, wherein there is a conflict when the first record and the second record each consume the same particular association of the same particular item with the same particular entity; and conditional on there being a conflict, rejecting at least one of the first intended record and the second intended record. The method may further comprise transmitting a non-consent indicator for at least one of the first and second intended record. The non-consent indicator typically comprises an identifier for the intended record or the intended record and an indicator that its inclusion in the ledger is not consented to (i.e. a conflict has been identified).

The non-consent indicator for the first intended record may be sent to a coordinator node or to a previous node or all previous nodes in the sequence. The non-consent indicator for the second intended record may be sent to the second node.

If the coordinator node receives a non-consent indicator, it does not transmit the verification data for the intended record and the nodes will not store (or persist) the record of the intended record. The coordinator node may transmit a non-commit instruction and/or the storing of the record may be timed out at each node.

If a previous node in the sequence receives a non-consent indicator, the node will not store (or persist) the record and it may send the non-consent indicator to the previous node in the sequence, and so on. The node which transmits the non-commit instruction may transmit it to all previous nodes in the sequence for each node to not store (or persist) the record.

The item associated with an entity may comprise digital currency.

Another aspect provides a computer-implemented method for verifying a record stored in a distributed ledger, wherein the distributed ledger is configured to store records and associated verification data for the records, wherein the verification data for a record identifies: (i) a sequence of nodes in the network which received the intended record during a verification procedure; and (ii) the respective event state assigned by each node of the sequence of nodes to the intended record during the verification procedure, the method comprising: receiving a request to verify a record; using the verification data associated with the record to contact each node in the sequence of nodes to request confirmation that the particular part of the verification data is correct; and conditional on each node of the sequence of nodes confirming that the particular part of the verification data is correct, verifying the record.

Another aspect provides a computer-implemented method for performing by a node to confirm that a particular part of the verification data for a record is correct in a distributed ledger, wherein the distributed ledger is configured to store records and associated verification data for the records, wherein the verification data for a record identifies: (i) a sequence of nodes in the network which received the intended record during a verification procedure; and (ii) the respective event state assigned by each node of the sequence of nodes to the intended record during the verification procedure, the method comprising: receiving a request to confirm that a particular part of the verification data is correct; checking the particular part of the verification data stored in the at least part of the distributed ledger maintained by the node; and conditional on the particular part of the verification data being correct, confirming that the particular part of the verification data is correct.

Another aspect provides a computer-implemented method for performing by a node of a network of nodes for maintaining at least part of a distributed ledger maintained by the network of nodes, the method comprising: maintaining at least part of the distributed ledger, wherein the at least part of the distributed ledger is configured to store records and associated verification data for the records, wherein the verification data for a record identifies: (i) a sequence of nodes in the network which received the intended record during a verification procedure; and (ii) the respective event state assigned by each node of the sequence of nodes to the intended record during the verification procedure; wherein unique identifiers for accounts with the ledger associate each account with a corresponding part of the ledger.

The distributed ledger may comprise a plurality of partitions, each partition comprising a part of the distributed ledger. Each node of the network may be configured to store (i) zero partitions (ii) one or more of the plurality of partitions, or (iii) the plurality of partitions.

The distributed ledger may be configured to store records and associated verification data for the records. It may be configured to store associated record identifiers for the records. It may be configured to store associated event states corresponding to when the node first received the intended record, if the record was received through an update from another node, the event state corresponding to when the node first received the record.

The intended record may comprises a record and, at least, a verification element identifying the respective event state assigned by the current node for the intended record. The intended record may comprise a record and a data structure comprising an identifier for the record, an identifier for the current node in the sequence, an event state for the intended record corresponding to the local event state of the current node in the sequence, and an identifier of the next node in the sequence.

The consent indicator may comprise an identifier for the intended record, an identifier for the current node in the sequence, the event state for the intended record of the current node in the sequence, and an identifier of the next node in the sequence. The verification data may comprise an identifier for each node and an indication of its position in the sequence, the event state for the intended record of each node in the sequence. The verification data may comprise, for each node in the sequence, an identifier for the node, the event state for the intended record of the node, and an identifier of the next node in the sequence. The commit instruction may comprise an identifier for the record and the verification data. These data are verification elements and may be provided in one or more data structure(s), as already described.

The intended record may comprise a record and, at least, verification elements comprising an identifier for the record, an identifier for the current node in the sequence, the event state assigned to the intended record by the current node in the sequence, and an identifier of the next node in the sequence. This structure may be used with an implementation that uses a coordinator node.

The intended record may comprise a record and, at least, verification elements comprising an identifier for the record and a respective or local event state for the intended record assigned by the current node in the sequence. The intended record may further comprise, for each node in the sequence as the intended record is passed along it, verification elements comprising an identifier for the current (observer) node in the sequence, and an identifier of the next node (the next observer node) in the sequence. This structure may be used with an implementation that does not require a coordinator node.

A data structure (e.g. a verification coordinate) may comprise the verification elements.

Not all nodes in the sequence necessarily perform checking for compliance with one or more defined criteria and/or for conflicts. It is possible to have a sequence in which one or more nodes simply assign an event state to the intended record and pass on the intended record. One or more other nodes in the sequence may perform checking with one or more defined criteria. One or more other nodes may perform checking for conflicts.

Another aspect provides a computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising: maintaining a static time value for each association, wherein the static time value is increased in dependence on the length of time that the association remains unused; maintaining a reputation weight for the node, wherein the reputation weight for the node is increased when the node takes part in a verification procedure for an intended record that is committed to the ledger, wherein the amount that the reputation weight for the node is increased is based on an allocated share of the static time value for the association that is used up by the record of the intended record; and using the reputation weight of the nodes in the network to resolve a conflict between two records, wherein the record which underwent a verification procedure with a sequence of nodes with the lower total reputational weight is rejected.

Another aspect provides a computer program comprising computer-executable instructions which, when executed on a computer, cause the computer to perform any of the above methods.

Another aspect provides a computer node comprising at least one computer processor and at least one computer memory, wherein the computer memory comprises computer-executable instructions which, when executed, cause the computer node to perform any of the above methods.

Nodes of the network, which may be a peer-to-peer network, may be configured to perform the same methods.

Another aspect provides a network of computer nodes, wherein each computer node comprises at least one computer processor and at least one computer memory, wherein the computer memory comprises computer-executable instructions which, when executed, cause the computer node to perform any of the above methods.

Accordingly, it will be appreciated that an improved distributed ledger technology or architecture is provided. Improved speeds of storing to a distributed ledger can be achieved. A digital ledger technology is provided which is scalable for use in a wide range of applications. As far as digital currency transactions are concerned, improved transaction throughputs are provided. When using the disclosed ledger technology/architecture to store digital currency transactions, transactions per second (tps) throughput can increase linearly with the number of nodes present within the network. Generally, every 10 nodes in the network increases network throughput by around 1000 tps when using commodity hardware. Verification procedures (or consensus procedures) that form at least part of an improved verification or consensus mechanism are also provided. For example, a verification mechanism is provided which is not prone to centralization over time and which does not consume the large amounts of resources that known architectures consume.

BRIEF DESCRIPTION OF THE FIGURES

Illustrative implementations of the present disclosure will now be described, by way of example only, with reference to the drawings. In the drawings:

FIG. 4 shows data stored in a ledger maintained by a computer node for a first implementation;

FIG. 5 shows the structure of a new intended record comprising a record for inclusion in a distributed ledger for the first implementation;

FIG. 6 shows a verification coordinate for an intended record for the first implementation;

FIG. 11 shows data stored in a ledger maintained by a computer node for a second implementation;

FIG. 12 shows a set of consumable entries for the second implementation;

FIG. 13 shows an updated set of consumable entries for the second implementation;

FIG. 22 shows a set of consumable entries for a third implementation; and

FIG. 23 shows an updated set of consumable entries for the third implementation.

DETAILED DESCRIPTION

Figure 1:
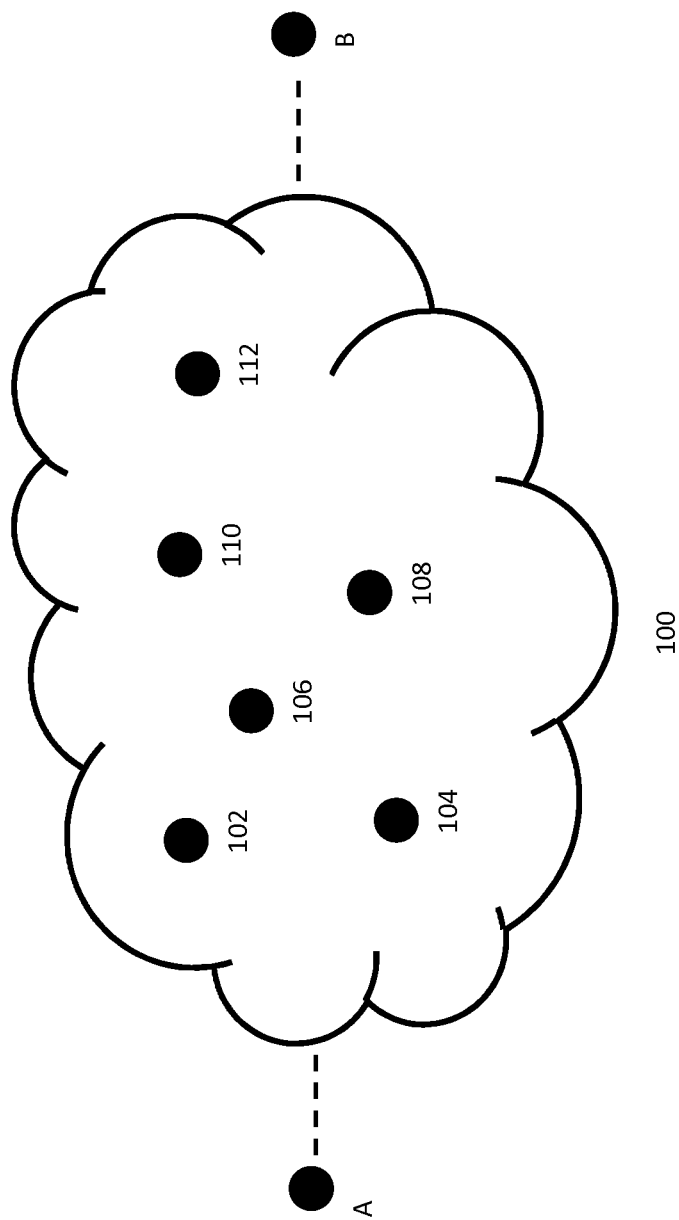
FIG. 1 shows a schematic representation of a network of computer nodes.

This detailed description begins by describing with reference to FIG. 1 a network of computer nodes on which implementations of a distributed ledger can be maintained. A conceptual stack model showing how the same ledger functionality can support different applications is then described with reference to FIG. 2. FIG. 3 is used to describe the components of a computer that can be used as a computer node in the network. A first, simple implementation relating to the storing of emails is then described with reference to FIGS. 4 to 10. A second, more complex, implementation relating to recording ownership of artwork is then described with reference to FIGS. 11 to 21. A third implementation relating to payments using digital currency is then described with reference to FIGS. 22 and 23. A fourth implementation and variations of all implementations are also described. The features of the different implementations and those of the variations are not mutually exclusive. Rather, the features of all implementations and those of the variations can be used with one another and with those recited in the claims.

Referring to FIG. 1, a network 100 comprising a plurality of nodes 102 to 112 is shown. Computers A and B are computers that can connect to the network 100. Computers A and B are user computers (or other electronic devices) which typically play no active part in storing and maintaining the distributed ledger, or in the associated verification procedures that will be described.

Nodes 102 to 112 are connected by the network 100. Network 100 may be any suitable network, such as the internet. User computers A and B can connect to the network using any suitable technology, for example via a wireless or wired connection.

Figure 2:
FIG. 2 depicts a stack model for the digital ledger.
Figure 3:
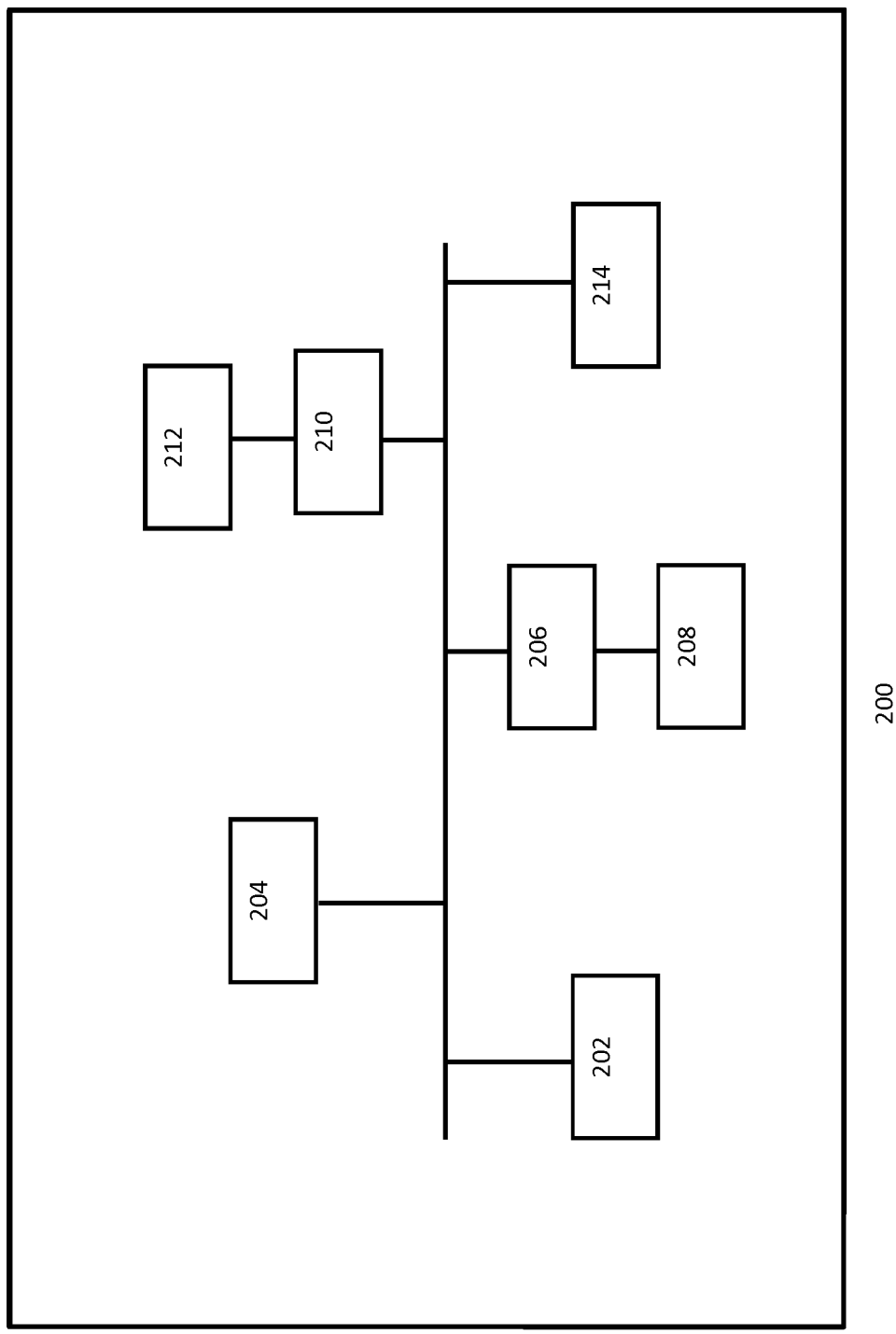
FIG. 3 shows a schematic representation of a computer.

FIG. 2 depicts a conceptual stack model for the digital ledger architecture. The Network Layer 101 provides data routing paths for network communication between nodes. The Ledger Layer 103 is the layer that handles the non-application specific elements of the distributed ledger technology, which include processing intended records comprising records intended for the ledger, storing records in the ledger, and storing verification data associated with each record. The Application Layer 105 supports the application specific functionality including application specific functionality for the particular implementation, the structure of the record and user interaction. Records comprising record data are created in the Application Layer and are then passed to the Ledger Layer for processing. Example applications that may be supported in the Application Layer 105 include applications relating to the recording of ownerships of pieces of art, applications relating to recording transactions, in particular financial transactions (e.g. digital currency), and storing records of legal documents.

FIG. 3 shows a schematic and simplified representation of a computer node 200 which can be used to perform the described methods. Computer nodes 102 to 112 and user computers A and B can have the general structure of computer node 200.

The computer 200 comprises various data processing resources such as a processor 202 coupled to a central bus structure. Also connected to the bus structure are further data processing resources such as memory 204. A display adapter 206 connects a display device 208 to the bus structure. One or more user-input device adapters 210 connect a user-input device 212, such as a keyboard and/or a mouse to the bus structure. One or more communications adapters 214 are also connected to the bus structure to provide a connection to the network 100.

In operation, the processor 202 executes a computer program comprising computer executable instructions that may be stored in memory 204. The results of the processing performed may be displayed to a user via the display adapter 206 and display device 208. User inputs for controlling the operation of the computer system 200 may be received via the user-input device adapters 210 from the user-input devices 212.

The described implementations will refer to a node or nodes (or processes or procedures at a node or nodes) performing particular steps or operations. It will be appreciated that in the described implementations these steps or operations are performed by the processor of the node or nodes based on instructions that are stored in memory. Procedures or operations described as being performed by a layer of the conceptual stack model are similarly performed by the processor of the node or nodes based on instructions that are stored in memory.

As a brief overview, in the described implementations when a record from an application in the Application Layer 105 is to be included in the ledger, procedures in the Ledger Layer 103 construct an intended record. Procedures in the Ledger Layer 103 then perform a verification procedure for the intended record. The intended record comprises the record and verification data elements which are used and updated during the verification procedure. The verification procedure involves the intended record being passed along a sequence of nodes in the network. Nodes in the network are configured to update a unique local event state for the node during a verification procedure performed on a received intended record and to assign the updated event state to the received intended record.

The identities of the sequence of nodes and their order, i.e. the path, and the respective event state assigned by each node of the sequence of nodes to the intended record during the verification procedure are stored as the verification data. At any point in the future, the verification data can be used to verify a record by checking that each node has the same verification data and by each node in the sequence confirming that the event state it assigned to the corresponding intended record according to the verification data matches its assigned event state stored for the record in the ledger. The assigned event state being referred to here is the event state assigned by the node to the record when it first received the record as part of an intended record during the verification procedure for the intended record. This "assigned event state" will generally be referred to as the "assigned event state" or similar, but if the context is not otherwise clear, it will be referred to as the "verification-procedure-assigned event state" or similar.

As well as receiving intended records as part of a verification procedure, nodes may also receive records that have already been stored in the ledgers of other nodes in the network. In the described implementations such records are received during an update using a gossip protocol. When a node receives a record in this way (one that it has not received before), it updates its local event state and assigns the updated event state to the received record. The node then stores, in its copy of the ledger, the received record and the associated/assigned event state which the node assigned to the record. If the context is not otherwise clear, this event state will be referred to as the "update-process-assigned event state" or similar to distinguish it from the "verification-procedure-assigned event state". The key difference between the two event states is that for the former the node had the record reported to it as an update from another node whereas for the latter the node was involved in the verification procedure.

A first implementation will now be described. In the first implementation, the local event state of a node is determined using a logical event clock. In the first implementation the logical event clock is a Lamport clock. The event states assigned by the node to received intended records and records in the first implementation are therefore logical event clock count values or, more specifically, Lamport clock values. In the first implementation, a node updates its local event state each time it receives an intended record as part of a verification procedure. A node also updates its local event clock each time it receives a record as part of an update process. In other words, the event state for a node updates each time a new record is received either as an intended record in a verification procedure or as a record as part of an update process. In a variation, the event state is updated only for received intended records and not for records received as updates. Receiving records as part of an update procedure is itself an optional feature.

An aspect of the first implementation provides a way to store records and associated data in the distributed ledger. FIG. 4 shows data stored in a ledger for the first implementation. The ledger is maintained by a computer node which stores records that have been verified (when part of an intended record) by a verification procedure. In this implementation, all nodes in the network maintain a copy of the complete distributed ledger, so each node's local copy, such as that shown in FIG. 4, is a complete copy. The ledger is configured to store data comprising records. In this first implementation, each record in the distributed ledger is a record of an email sent from one user to another, for example from user A (the user of user computer A running an email application using the distributed ledger architecture) to user B (the user of user computer B also, although not necessarily, running an email application using the distributed ledger architecture). When user A sends an email using the application, the Application Layer 105 running the email application generates or creates a record containing record data. In this first implementation the record data comprises a payload, which comprises the sender, the receiver, the send time, the email text and the attachments.

The copy of the ledger stored locally by each node in the network 100 stores records of emails that have been sent and stored in or persisted to the distributed ledger. For each record, the ledger of a node stores a record identifier (record ID) for that record, an assigned event state assigned by the node to that record when it received the record (either as part of an intended record during a verification procedure or as a record as part of an update process), verification data for that record, produced during a verification procedure, and the record itself.

Turning back to FIG. 14, the record ID of a record is a unique identifier which identifies a particular record. In this implementation, the record ID is a number generated by hashing the record. This has the advantage of guarding the record against tampering—even a small change to the record data will result in a noticeable change to the value generated by hashing the record. The new hash value will not match the Record ID, and so the tampering can be detected.

The terms "identifier" and "ID" are used interchangeably herein.

The assigned event state recorded for a record in the ledger is the local event state which the node maintaining the ledger assigned to the record when it first received the record.

A node may first receive a record as part of a verification procedure i.e. when the record is part of an intended record undergoing the verification procedure. This will occur if the node takes part in the verification procedure for that record (when part of an intended record). In this case, the assigned event state assigned to the record and stored in ledger will be the local event state of the node when it received the intended record during the verification procedure. This is the "verification-procedure-assigned event state", referred to earlier.

Alternatively, if a node does not take part in the verification procedure for an intended record, it may be informed about that record at a later time by way of an update from another node. In this case, the assigned event state assigned to the record and stored in ledger will be the local event state of the node when it received the record during the update. This is the "update-process-assigned event state", referred to earlier.

In this implementation, updates comprise receiving data from other nodes of the network 100 through a gossip protocol. In the present implementation, the gossip protocol involves a node broadcasting, to other nodes in the network, Record IDs that it has stored in its ledger. Typically, these Record IDs are the ones that have recently been added to its ledger. Responsive to this, each of the receiving nodes checks its own local ledger to see if it already contains the broadcast Record IDs (and the other associated data). Any missing data, in particular the data for one or more of the broadcast Record IDs that are not stored in the node's copy of the ledger, can then be requested and received from the broadcasting node. A similar update process can be initiated by a node requesting another node to send or broadcast its recent Record IDs or a set of Record IDs that have been stored since a certain time.

In the first implementation, each node stores a complete copy of the distributed ledger, and therefore stores every record. However, this is not necessary and in a variation a node can store any combination of records in its copy of the ledger or even no records at all. This is a departure from prior distributed ledger technologies. In block chain, for example, the linked nature of the chain of blocks comprising the records means that a node needs to receive the block chain ledger in its entirety when updating.

Using the described methods, updating nodes are able to receive data for specific records, without having to receive data for all records. This again is a departure from prior approaches. For example, nodes can elect to receive information about records recently included in the ledgers of other nodes before they receive information about older, potentially less relevant records.

Advantageously, this functionality means that, unlike in block chain, nodes using the described methods can operate usefully in the network 100 as soon as they join the network. This is because, for example, they may participate in the verification procedure for intended records even if they store an incomplete ledger, or store no ledger at all. Systems such as block chain lack this functionality, because they require that every node participating in the network has a full copy of the entire block chain or ledger structure, before that node is allowed to take part in processes using the ledger. A new node joining the block chain must currently receive approximately 250 Gigabytes of data before it can take part. This is hugely resource intensive. Implementations of the present disclosure thus represents a huge potential decrease in bandwidth use and computational burden, by allowing nodes to partake in supporting aspects of the distributed ledger even while holding a partial or no ledger themselves.

Returning now to FIG. 4, the verification data for a record comprises information about which nodes of the network 100 were involved in the verification procedure for that record (when the record was part of an intended record).

An aspect of the first implementation provides a method of initiating a verification procedure for an intended record.

The verification procedure in the first implementation, described in more detail below, comprises the intended record being passed along a sequence of nodes in the network and, in response to receiving the intended record, each node in the sequence updating their local event state and assigning the updated event state to the intended record as an assigned event state. Verification elements in the form of identifiers for the nodes and the assigned event states are used to construct verification data for the intended record. Once the verification procedure for an intended record is complete, the record is included as a record in the distributed ledger and stored to the local ledgers of those nodes which performed the verification procedure, along with the verification data constructed for that intended record. The verification data identifies the sequence of nodes of the network which received the intended record as part of the verification procedure and the event state value assigned to the intended record by each of the sequence of nodes during the verification procedure. In the first implementation, the verification data comprises an ordered list of node identifiers (each identifying a corresponding node in the network) and the corresponding event state assigned to the intended record by each node. The order of the ordered list is the order of the sequence of nodes along which the intended record was passed. More particularly, in the first implementation the verification data comprises a list of coordinates, each coordinate comprising the Record ID, the sender node ID, the receiver node ID, and the event state assigned to the intended record by the sender node. In the first implementation node IDs are unique 96 bit numbers. In the first implementation, the coordinate and list of coordinates can be considered vector states as they each comprise more than one event state.

The verification procedure, involving the assigning of event states to each intended record received, means that a "causality path" is built up for each intended record. This means that the verification data for a record contains data defining which nodes received the record, and in what order, while the record was part of the intended record undergoing the verification procedure. With a large enough sequence or path length for the sequence, verification or consensus from a significant portion of the network can be given that the record stored in the ledger is the unaltered record as received during the verification procedure. In this first implementation, a vector clock is used to store the verification data, which comprises a vector event state. The coordinates of the vector show which nodes received the intended record and the event states assigned by each node to the intended record when it received the intended record during the verification procedure. The vector event states of different records may also be compared to resolve conflicts between the records, as will be discussed in relation to the second, third and fourth implementations. In the first implementation, in which a gossip protocol is used, a vector length (or number of nodes in the sequence) of $\log(n)*3$, where n is the number of nodes in the network, provides good performance. A vector or sequence length of around this size balances security and speed requirements, though the actual value used is a matter of choice for any particular implementation.

As will be apparent from the above description, in the described methods nodes are individually involved in determining a causality path and a relative order of events. Verification/consensus is therefore agreed in an active manner in which all nodes can participate. This is in contrast to existing consensus methods, in which consensus is obtained through, for example, proof-of-work methods, as is the case in block chain. Block chain's passive method of agreeing consensus utilises provisional verification, known as "0-confirmation". Nodes are not actively involved in determining consensus. Rather, random chance and proof-of-work are used to determine ordering of events. This not only isolates nodes from the consensus procedure, leading to a potential lack of trust in the network, but the need to use provisional 0-confirmation also leads to a time window of vulnerability, between 0-confirmation and full confirmation through entry to the block chain. In this time window, so-called Finney attacks are possible, in which the network is flooded with malicious duplicate transactions. The active verification/consensus methods described herein remove the requirement for 0-confirmation and therefore remove the window of vulnerability. They also empower nodes to actively take part in the consensus procedure, leading to a more transparent and verifiable ledger and network. Thus, implementations of the present disclosure provide a more secure method of agreeing consensus across a network of nodes maintaining a distributed ledger.

Turning back to FIG. 4, the final data stored in the ledger is the record itself. The record comprises record data which in this implementation comprises a record payload. The payload contains the details of a deliverable or delivered item. In the first implementation, the record relates to an email. Therefore, the payload comprises the relevant data for the email, as has already been described.

The data shown in FIG. 4 shows an entry relating to a record of Email 1001 in a copy of the distributed ledger stored by a node. The entry comprises: the Record ID of the record of Email 1001; the event state assigned to the record of Email 1001 by the node, either when it received the record during an update or as part of an intended record during a verification procedure for the record; the verification data produced during the verification procedure for the record when it was part of an intended record; and the record itself, comprising the record data which comprises the payload.

If a new record of, say, email 1002 is to be included in the distributed ledger, the record must first undergo a verification procedure. A record of email 1002 is therefore created and passed from the Application Layer 105 to the Ledger Layer 103. The Ledger Layer constructs the intended record comprising the record of email 1002.

FIG. 5 shows the structure of the intended record 400 for the first implementation. The intended record 400 comprises the record relating to Email 1002 and a verification coordinate for the record, comprising verification elements for use in the verification procedure. The intended record 400 also includes the ID of a coordinator node for the verification procedure. The coordinator node is the node which receives the record, constructs the intended record and initiates the verification procedure for the intended record. The coordinator node also performs various further functions as will be described.

The structure of the verification coordinate is shown in FIG. 6. In the first implementation the verification coordinate comprises five verification elements. The coordinate comprises the following verification elements: the record ID of the record of a given intended record 400; the ID of the sender node that is sending the intended record 400 to the next node in the sequence of nodes; the ID of the recipient node receiving the intended record in the sequence of nodes; the event state assigned by the sender node to the intended record; and a node count value. The node count may be omitted from the coordinate and instead included as metadata associated with the intended record 400. In some implementations, the verification coordinate also comprises a coordinate time value at which the sending node received the intended record. The coordinate time value is helpful for allowing nodes to update quickly, because nodes can quickly determine whether a record entered the network 100 during a time that the node was offline or unavailable.

As the verification procedure progresses and the intended record is passed along the sequence of nodes performing the verification procedure, the verification coordinate will be updated by each node in the sequence. Through this updating of the verification coordinate, the verification data for a record can be constructed. The verification procedure will now be described in detail.

Figure 7:
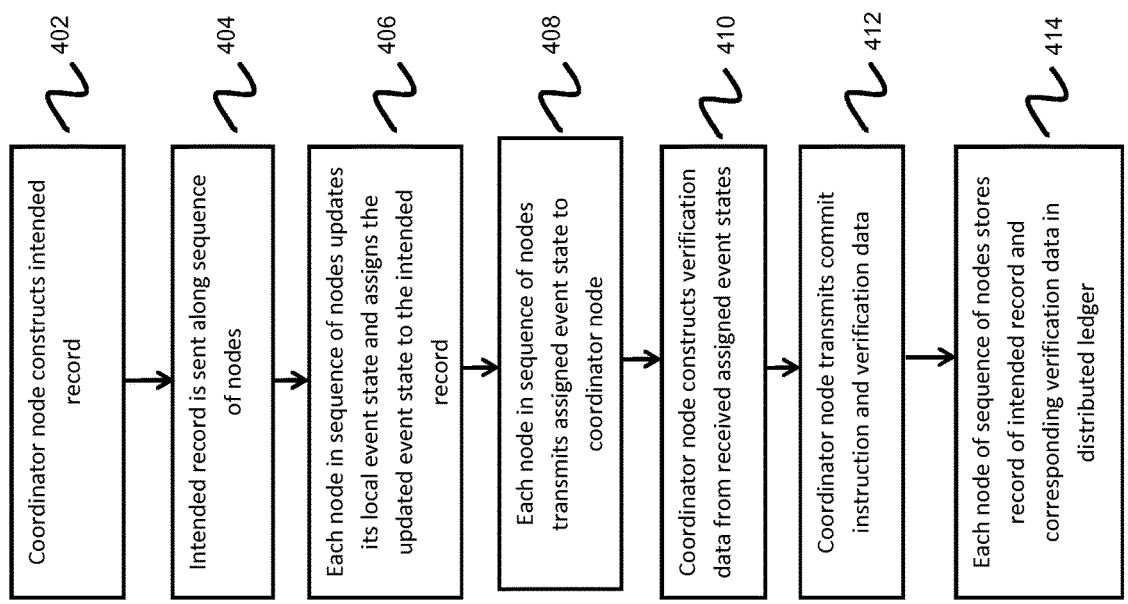
FIG. 7 shows an overview of a verification procedure for an intended record comprising a record intended for a distributed ledger for the first implementation.
Figure 8:
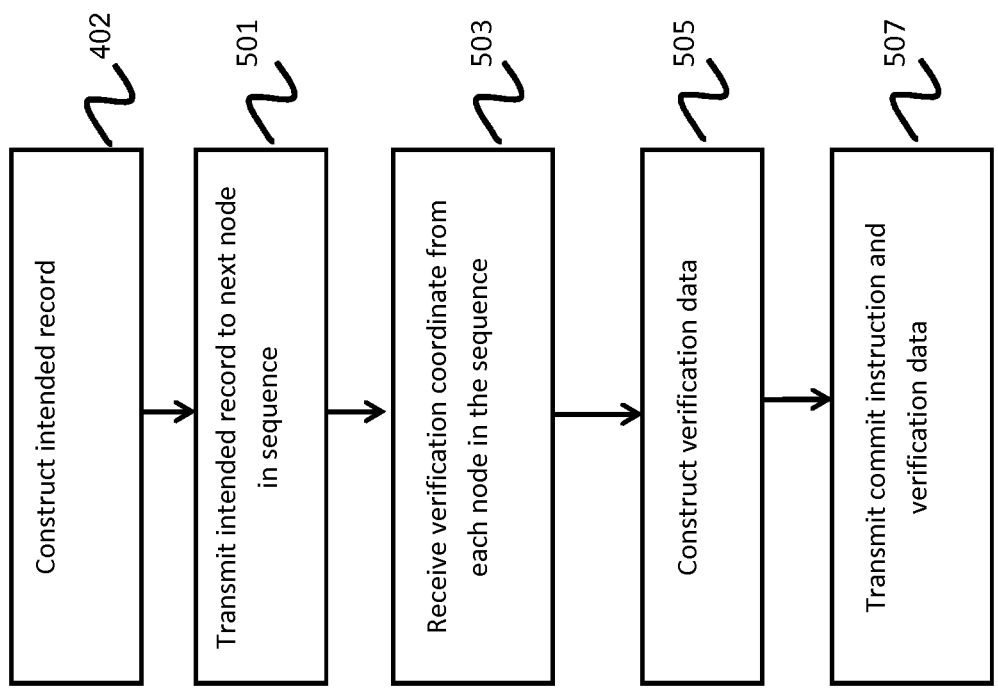
FIG. 8 shows a flow diagram depicting the verification procedure from the perspective of a coordinator node for the first implementation.

FIG. 7 shows an overview of the verification procedure for an intended record comprising a record intended for a distributed ledger.

The Application Layer passes a record to the Ledger Layer. A coordinator node, for example node 102 of FIG. 1, at step 402 receives the record and constructs the intended record comprising the record intended for the distributed ledger, the verification coordinate and the coordinator node ID. The coordinator node updates its local event state upon receiving the intended record and assigns the updated event state to the intended record. The coordinator node sets the verification coordinate to include: the record ID, the coordinator node ID (because the coordinator node is the current sender node), the ID of the next node in the sequence (the node that the coordinator is going to send the intended record to), the event state that the coordinator node has assigned to the intended record, and a node count value which is the total number of nodes that will feature in the sequence. This number is defined for the ledger in the first implementation.

At step 404, the intended record is sent along the sequence of nodes in the network 100. At step 406, each node in the sequence of nodes updates its local event state upon receiving the intended record and assigns this updated state to the intended record. As previously described, in this implementation the event states are logical clock count values, so the states being assigned to the intended record in this implementation are logical clock count values.

At step 408, each node transmits its respective assigned event state to the coordinator node 102. In the first implementation these procedures are performed by updating the verification coordinate and passing the verification coordinate to the next node in the sequence and by sending the verification coordinate to the coordinator node.

At step 410, the coordinator node 102 constructs verification data from the assigned event states it receives from the nodes of the sequence of nodes. In the first implementation, this procedure is performed by the coordinator node aggregating the received verification coordinates, which each contain the respective event states assigned to the intended record by each respective node.

At step 412, the coordinator node 102 transmits a commit instruction and the verification data it has constructed 410 for the intended record to each of the nodes of the sequence. In the first implementation, the verification data comprises the aggregated verification coordinates received from each of the nodes in the sequence. The commit instruction can be sent along the sequence of nodes one by one or can be sent directly to the nodes in the sequence.

At step 414, nodes of the sequence then store the record of the intended record and the corresponding verification data in their respective copy of the distributed ledger.

Other nodes in the network may later update their copies of the ledger using the gossip protocol or related update procedures.

The verification procedure described with reference to FIG. 7 will now be described in further detail, first from the perspective the coordinator node 102 and then from the perspective of a node in the sequence of nodes performing the verification procedure.

The first implementation provides a method of receiving data during the verification procedure and constructing verification data for the record of the intended record. The verification procedure from the perspective of the coordinator node 102, after the coordinator node 102 has constructed the intended record and assigned an updated event state to the intended record, will now be described with reference to FIG. 8. At step 402 the coordinator node receives the intended record, constructs the intended record, updates its local event state, assigns the updated event state to the intended record and sets the verification coordinate accordingly. The coordinator node also sets the coordinator node ID (Node 102) in the intended record. Thus, the intended record at the end of step 402 comprises the record (in this implementation the email record), the coordinator node ID (Node 102), and the verification coordinate in the form: (#email1002 #, Node 102, Node 104, 23, 19) where #email1002 # is the Record ID, Node 102 is the identifier of the coordinator node, Node 104 is the identifier of the next node in the sequence, 23 is the event state assigned by the coordinator node 102 to the intended record, and 19 is the node count value. It will be appreciated that this verification coordinate corresponds to the structure shown in FIG. 6.

The coordinator node 102 then transmits at step 501 the intended record to a next node 104 in the sequence of nodes of the verification procedure for the intended record. Node 104 updates its local event state upon receiving the intended record and assigns the updated state to the intended record. Node 104 also updates the verification coordinate of the intended record and transmits the updated verification coordinate to the coordinator node. Coordinator node 102 receives the verification coordinate including the event state assigned to the intended record by node 104. Node 104 also passes the intended record to the next node in the sequence and each node in turn updates the verification coordinate of the intended record and transmits the updated verification coordinate to the coordinator node, and passes the intended record along to the next node in the sequence.

In this implementation, each node selects the next node in the sequence to which it sends the intended record. If an indicator to confirm that the further node will participate in the verification procedure is not received within a defined time period, the node selects a different next node.

Having received at step 503 the verification coordinates including the event states assigned to the intended record by each node in the sequence, the coordinator node 102 can construct at step 505 the verification data for the record of the intended record by aggregating the verification coordinates it has received. The coordinator node is able to determine that it has received all of the verification coordinates as it can follow the sequence of nodes from the verification coordinates. Each verification coordinate contains data identifying the next node in the sequence. Also, the coordinator node is able to determine, from the node count value that it inserted in the coordinate originally, the total number, m, of coordinates it expects to receive (one from each node in this implementation).

Having constructed the verification data at step 505, the coordinator node 102 transmits at step 507 a commit instruction and the constructed verification data to each node in the sequence of nodes. The verification data in this implementation comprises an m times array of the received verification coordinates, where m is the number of nodes in the sequence of nodes.

As will be appreciated, an aspect of the first implementation provides a method of receiving an intended record during a verification procedure, assigning an event state to the intended record and transmitting the assigned event state for the intended record. The method in this implementation also comprises sending the intended record to a further node in the network.

Figure 9:
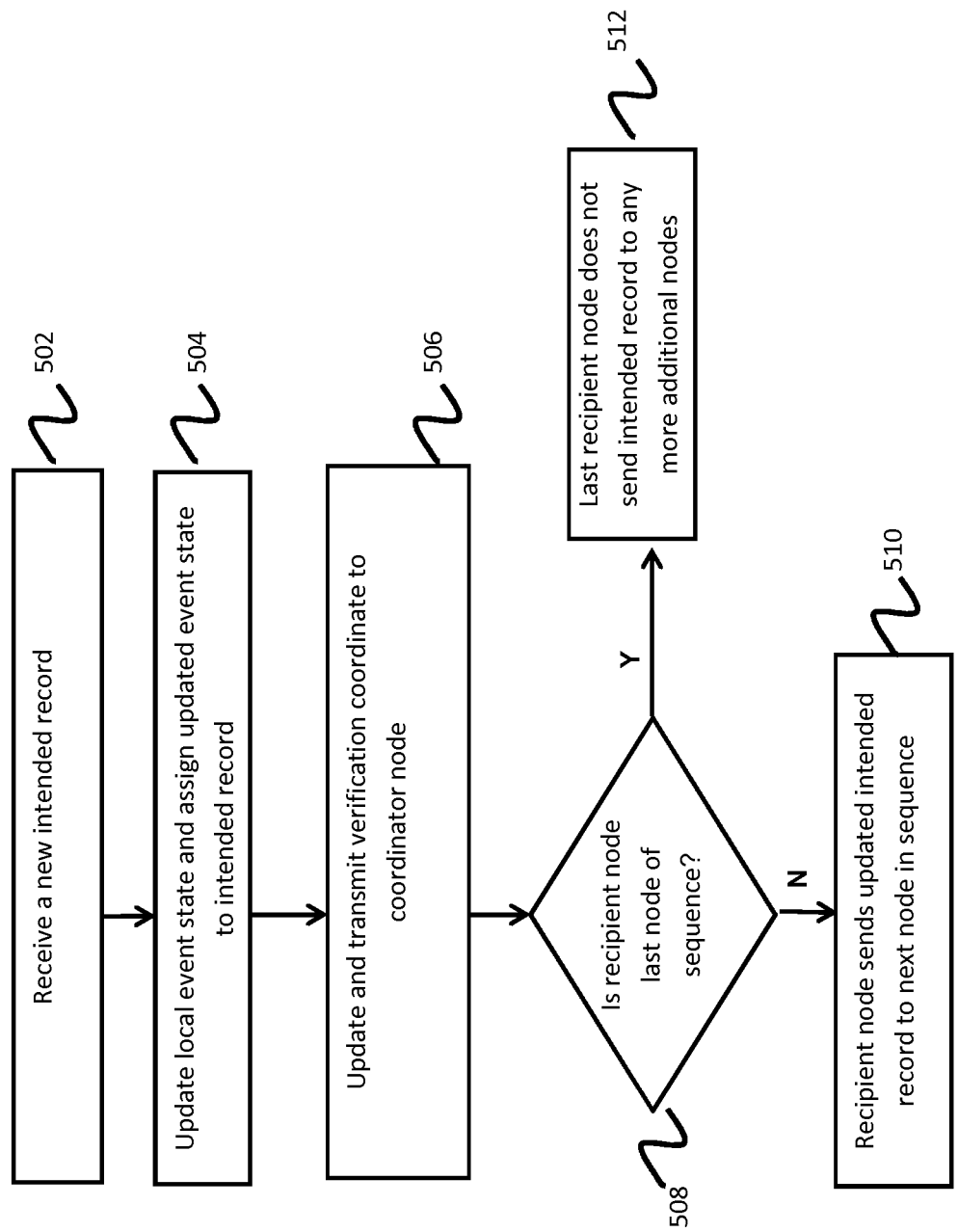
FIG. 9 shows a flow diagram depicting the verification procedure from the perspective of a node in the sequence of nodes performing the verification procedure for the first implementation.

The verification procedure from the perspective of a node in the sequence of nodes will now be described with reference to FIG. 9.

The node receives at step 502 an intended record. Upon receiving the intended record, the node updates its local event state and assigns the updated event state to the intended record at step 504. For example, if the second node in the sequence (after the coordinator node) is Node 104, the verification coordinate received from node 102 reads (#email1002 #, Node 102, Node 104, 23, 19). This indicates that the record ID of the record of the intended record is #email1002 #. The sender ID is node 102. The recipient ID is node 104. The local event state of node 102 when it received the intended record, and thus the event state it assigned to the intended record, was 23. The node count is 19.

At step 506 the node updates the verification coordinate and sends it to the coordinator node 102.

A check is made at step 508 to determine if the node is the last node required in the sequence of nodes. If the node determines it is not the last node of the sequence, at step 510 the node sends an updated version of the intended record to the next node 106 in the sequence, including the updated verification coordinate. In this example, the updated verification coordinate now reads (#email1002 #, Node 104, Node 106, 81, 18). 81 is the event state assigned by node 104 to the intended record. The node count value now reads 18, because one more node has received the intended record and updated the verification coordinate. Each node will subtract 1 from this node count value as it updates the verification coordinate respectively. When the node count value reaches 0, the final node of the sequence has been reached. It will be apparent that there are various ways in the nodes of the sequence of nodes could keep track of how many nodes in the sequence of nodes remain. In a variation, the node count value could count up until it reaches a pre-defined value.

In this implementation, the node also stores the intended record in a pending list.

Node 106 then performs steps 502 to 508. If node 106 also determines that it is not the last node of the sequence, node 106 sends the updated intended record to the next node, 108. The verification coordinate sent from node 106 to node 108 will read (#email1002 #, Node 106, Node 108, 12, 17). This indicates that node 106's local event state when it received the intended record, and thus the event state it assigned to the intended record, was 12. The node count value has once more been reduced by 1.

Once this procedure has been performed 17 more times (once for each node in the sequence), the final node of the sequence will update the verification coordinate at step 506 and the node count value will read 0. The final node of the sequence therefore transmits its verification coordinate to the coordinator node 102 as usual, but, at step 508, determines that it is the last node in the sequence. The node therefore does not transmit to any further nodes of the sequence at step 512. The coordinator node 102 transmits at step 507 a commit instruction and the verification data. The verification data in this implementation comprises an m times array of the received verification coordinates, where m is the number of nodes in the sequence of nodes. In this implementation, the commit instruction comprises the record, the record ID and the verification data, with each node in the sequence forwarding the commit instruction to the next node in the sequence after committing. In a variation, the commit instruction may simply comprise the sending of the verification data i.e. sending the verification data is an implicit commit instruction.

Until this point, nodes that have completed steps 502-510 store the intended record in a pending list. Upon receiving the commit instruction, each node in the sequence of nodes (or at least those maintaining the relevant part of the ledger), including the coordinator node 102, removes the intended record from its pending list and stores (or persists) the record of the intended record in the ledger maintained by each node. Each node also stores its local event state at the time of receiving the intended record (which, for the nodes in the sequence, will be the event state they assigned to the intended record during the verification procedure) and the verification data constructed 505 by the coordinator node 102. Thus, each node can fill in a new row (as depicted) in its local ledger and the record of email 1002 can be included in the distributed ledger.

The method described above allows the network of nodes 100 to build a distributed ledger, in which each record in the distributed ledger is associated with verification data. This verification data can be checked to verify a record in the distributed ledger. For example, the verification data can be checked at a later date in response to a user initiated request. This process will be described with reference to FIG. 10.

Each record identifies, through its associated verification data, the sequence of nodes in the network 100 which received the corresponding intended record 400 during its verification procedure and the respective event state assigned by each node of the sequence to the intended record during this verification procedure. Therefore, a user wishing to verify the record can call on a procedure which uses the verification data of that record to contact each node in the sequence of nodes identified by the verification data and request confirmation that the particular part of the verification data is correct. More particularly, each node in the sequence can receive a request for it to confirm that the same verification data is stored for the record as that provided to the user. Additionally or alternatively, each node in the sequence can be asked to confirm that the verification coordinate that it produced or its verification-procedure-assigned event state for the record corresponds with that provided to the user. Additionally or alternatively, each node in the sequence can be asked to confirm that the verification coordinate that it received corresponds with that provided to the user.

Figure 10:
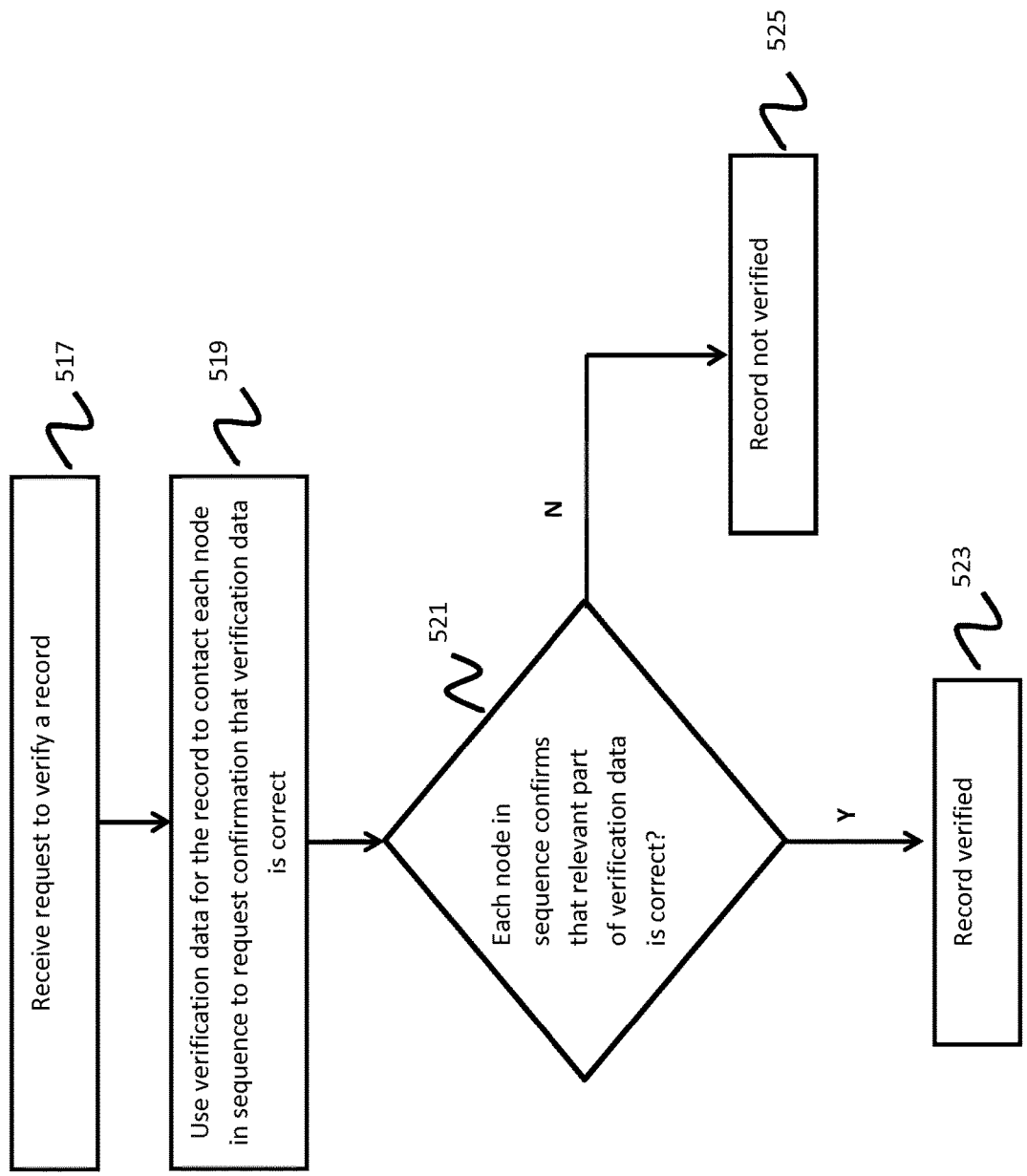
FIG. 10 shows a flow diagram depicting a record verification procedure for the first implementation.

With reference to FIG. 10, a request is received at step 517, by a node in the network 100, to verify a record in the distributed ledger. The verification data of the record is used at step 519 to contact each node in the sequence of nodes that performed the initial verification procedure for that record. Each node is requested to confirm whether or not the verification data is correct. Each node in the sequence either confirms at step 521 or does not confirm that the verification data is correct. Conditional on each node of the sequence of nodes confirming that at least a relevant/particular part of the verification data is correct, the record can be verified at step 523. In the case that one or more nodes of the sequence of nodes does not confirm that the verification data is correct, the record is not verified (step 525). Alternatively, a threshold is set and a certain number or percentage of nodes need to confirm that the particular part of the verification data is correct for the record to be verified.

From the perspective of each node performing this user-initiated verification, the node receives a request to confirm that the particular part of the verification data is correct. The node then checks the particular part of the verification data stored in the at least part of the distributed ledger maintained by the node and, conditional on the particular part of the verification data being correct, confirms that the particular part of the verification data is correct.

This can be used to verify that an event occurred, for example that an email was sent. Also, the verification data can be used to establish the exact order in which records were stored to the ledger.

A first implementation has been described in detail and some variations have also been described. In another variation, a coordinator node is not used and the intended record does not comprise the coordinator node ID. In this variation, the verification data is built up as the intended record is passed along the sequence of nodes. That is, each node adds a verification coordinate to the intended record until the last node in the sequence has an intended record which comprises the whole verification data. The last node can then transmit the verification data and commit instruction to all of the nodes in the sequence or the verification data and commit instruction can be passed along the sequence. In another variation, each node in the sequence of nodes can perform a check of the record of the intended record during the verification procedure, for example for compliance with format, structure, content, digital signatures or other criteria. In this variation, the commit instruction is not sent if a node reports that the check of the record has failed and the record is not stored in the ledger. This variation provides a method for checking the record of an intended record to confirm whether or not a node consents to inclusion of the record in the distributed ledger and, conditional on the node consenting, transmitting the event state assigned to the intended record by the node. Other variations are described in relation to the other implementations and at the end of the detailed description.

A second implementation relates to storing, in the distributed ledger, records concerning a change in ownership of an item identified by an item ID. In the second implementation, the record data is different from that of the first implementation, because the record data is application specific. In particular, the record data comprises consumables data which consumes the association of an item with one entity and, in this implementation, creates a new association of the item with another entity. The associations (or consumable associations) in this implementation comprise consumable entries, wherein a consumable entry associates an entity with an item and that association can be used up or consumed. Records can identify a consumable entry that is consumed by the record and can provide the data to create a new (unconsumed) consumable entry. In other words, a consumable entry can be used up or consumed by a record and another consumable entry can be created by a record. Although a variation retrieves up to date ownership data from the records stored in the ledger by querying the ledger, the second implementation also includes a set of consumable entries stored as meta data in the distributed ledger. Although the data is stored in the records, the consumable entries store a copy of the associations of entities with items (the consumable associations), which is a more efficient implementation than having to query the records to obtain up to date data on whether an association has been consumed or not. This set of consumable entries enables the ledger to keep track of changes of ownership. A consumable entry is an entry recording that a particular item, identified by its item ID, is currently owned by a specific entity (or owner). A consumable entry can be consumed (or used up) when the ownership of the item in question changes by a new record stored to the ledger. When this happens, in this implementation a new consumable entry is added to the set of consumable entries, to reflect the new owner of the item. The old consumable entry is then regarded as consumed due to the presence of a new consumable entry associated with the same item. Other than the different record data and the additional features relating to consumable entries and how they are processed and maintained, the second implementation operates in the same way as the first implementation.

FIG. 11 shows data stored in a ledger for the second implementation. The ledger is maintained by a computer node which stores records that have been verified (when part of an intended record) by a verification procedure. In this implementation, all nodes in the network maintain a copy of the complete distributed ledger, so each node's local copy, such as that shown in FIG. 11, is a complete copy. The ledger is configured to store data comprising records. In this second implementation, each record in the distributed ledger is a record relating to changes of ownership of artwork. The data shown in FIG. 11 is therefore similar to that shown in FIG. 4, with the exception that the record data in this second implementation comprises consumables data. The record data in this implementation does not comprise a payload, though in a variation the record data comprises a payload and consumables data. Consumables data in this implementation comprises a consumable entry ID for a consumable entry which associates an entity ID with an item ID. The data also comprises the ID of the entity to which ownership of the item is being transferred. Consumables data is used to update the set of consumable entries stored in the distributed ledger and verify current ownership of the items.

FIG. 12 shows an example set of consumable entries stored as meta data in the ledger. As new records are stored in the ledger, the set of consumable entries in the ledger is also updated based on the consumables data from the record.

The set of consumable entries shown in FIG. 12 contains five consumable entries. Each entry has a unique ID: #0001-#0005. Each entry further has an associated entity and item, the item being identified by an item ID. The entity in this implementation is the owner of the item. In this implementation, each entity has a public and private key. Digital signatures (using the private keys) are used to prove that an owner owns an item. The entry ID in this implementation is a hash of the entity ID and item ID. Each entry further contains a status indicator indicating whether or not the entry has been consumed. In this implementation, an entry is consumed when the entity has transferred their ownership of the item identified by the entry to a new owner/entity.

In the second implementation transfers of ownership of artwork are recorded. For example, Consumable Entry #0001 relates to entity A's ownership of item "Van Gogh 1". As this consumable entry has not been consumed ("Entry Consumed?: No"), Consumable Entry #0001 indicates that entity A is the current owner of item Van Gogh 1. This is true of entities B, C and E and respective items Rembrandt 1, Turner 1 and Picasso 1, as shown by Consumable Entries #0002, #0003 and #0005 respectively. The set of consumable entries in the ledger (specifically Consumable Entry #0004) also indicates that entity D was at one point the owner of Picasso 1 but is no longer the owner, as indicated by the fact that Consumable Entry #0004 has been consumed ("Entry Consumed?: Yes").

When a new record is stored to the ledger, the set of consumable entries stored by each node, such as that shown in FIG. 12, is updated to indicate the change in ownership of an item that has occurred, as a result of the new record being stored to the ledger.

As in the first implementation, any record that is to be stored to the ledger in the second implementation first undergoes a verification procedure as part of an intended record, wherein an intended record comprises a record intended for storing in the ledger. The record is generated or created by a user using their account on their user device. The user device stores data for the user's account, including the subset of consumable entries which include the entity IDs of non-consumed (owned) entries identifying the items owned by the user. The new record, as part of the intended record, is verified by a sequence of nodes and, once verification is complete, the record is added to the distributed ledger. If verification is successful, the consumables data provided by the new record is also used by each node to update the set of consumable entries stored as meta data in each node's local ledger.

Turning back to FIG. 12, in an example a new record to be stored to the ledger relates to entity A selling item Van Gogh 1 to entity B. In order for this record to be stored in the distributed ledger, an intended record is created. The intended record in this implementation has the same structure as in the first implementation, described in reference to FIG. 5. The content of the record (the record data) in the second implementation is different from that of the first implementation, as has already been described. In particular, the record data in the second implementation comprises consumables data.

The consumables data of the record of the intended record comprises the Entry ID of the consumable entry which identifies the item being transferred and the Entity ID the party to which its ownership is being transferred. In this implementation, the consumables data also comprises the digital signature of the current owner. The Entry ID of the entry is used to identify the entry of the set of consumable entries (FIG. 13) that is to be consumed (used up). Consumption of a consumable entry comprises changing the status indicator for the consumable entry in the set of consumable entries from "No" to "Yes". The Entity ID and the Item ID identified by the Entry ID are used to add a new consumable entry to the set of consumable entries already stored in the ledger as shown in FIG. 12. In a variation, the consumables data comprises the Entry ID and Entry ID (like this implementation), but also the item ID. In another variation, item data rather than an item ID. The consumables data may comprise further data depending on the application and particular implementation. In these variations, the consumables data can be used to create the new (unconsumed) consumable entry.

In an example, a new record concerning entity A selling item Van Gogh 1 to entity B is stored in the ledger. The consumables data of the record comprises the entry ID of Entry #0001 to identify the consumable entry and the item (Van Gogh 1) and "B", the identity of Entity B. The consumables data also comprises a digital signature of Entity A. Assuming that the intended record containing this new record is successfully verified through the verification procedure, the set of consumable entries stored in the ledger is updated as follows:

1. Consumable Entry #0001 will be consumed—"No" is changed to "Yes", in the status indicator column of Consumable Entry #0001. Consumable Entry #0001 has therefore been used up and cannot be validly used again.
2. A new consumable entry, Consumable Entry #0006, is added to the set of consumable entries stored in the ledger. This new consumable entry will contain the data: (#0006, B, Van Gogh 1, No).

Once this procedure is complete, the set of consumable entries stored as meta data in the ledger shown in FIG. 12 will have been updated to that in FIG. 13. It will be apparent from FIGS. 12 and 13 that the items owned by an entity can be easily determined from the set of consumable entries.

As well as updating the set of consumables entries in the ledger, the ledger is also updated in the same way as has been described in relation the first implementation. That is, the ledger is updated by each node to include the new record and the associated record ID, assigned event state and verification data.

An aspect of the second implementation provides a way to mitigate against "double spends". A double-spend occurs when an entity spends (or transacts or sells), the same item twice. In this implementation, a double spend would occur if the same consumable entry were consumed twice. For example, in the case of art ownership, a double-spend occurs if entity A transfers ownership of Van Gogh 1 to both entities B and C. This is clearly problematic because entity A should not be able to transfer (or sell) the same item to two entities. In the case of financial transactions, a double-spend is a known problem faced by distributed ledger technologies, and involves the same entity spending the same funds more than once. An example of a double-spend is a "Finney attack", described previously.

An aspect of the second implementation is able to mitigate against double spends by adding a checking process to the verification procedure, which nodes perform for each new intended record. The checking process involves each node in the verification sequence checking the consumable entry identified by the record of the intended record that is undergoing verification against the set of consumable entries stored in its ledger (such as that shown in FIGS. 12 and 13).

For example, if a node storing the data shown in FIG. 13 is part of the verification procedure for a new intended record, during the verification procedure the node will perform a check of which consumable entry is being consumed by the inclusion of the record of the intended record in the ledger. This is indicated by the consumables data in the record of the intended record. If the record of the intended record indicates that Consumable Entry #0001 is being consumed (for example because entity A is trying to record a transfer of ownership of Van Gogh 1 to entity F), the node performing the check will detect a conflict. This is because Consumable Entry #0001 has already been consumed (indicated by the entry "Entry Consumed?: Yes" in the node's ledger). Consumable Entry #0001 therefore cannot be validly consumed again, and so the node may reject the new intended record. A double-spend of item "Van Gogh 1" is thereby avoided. In the case where there is no conflict, i.e. the consumable entry identified by the record of the intended record is available for valid consumption, the verification procedure continues to the next node in the sequence of nodes, as in the first implementation.

Figure 14:
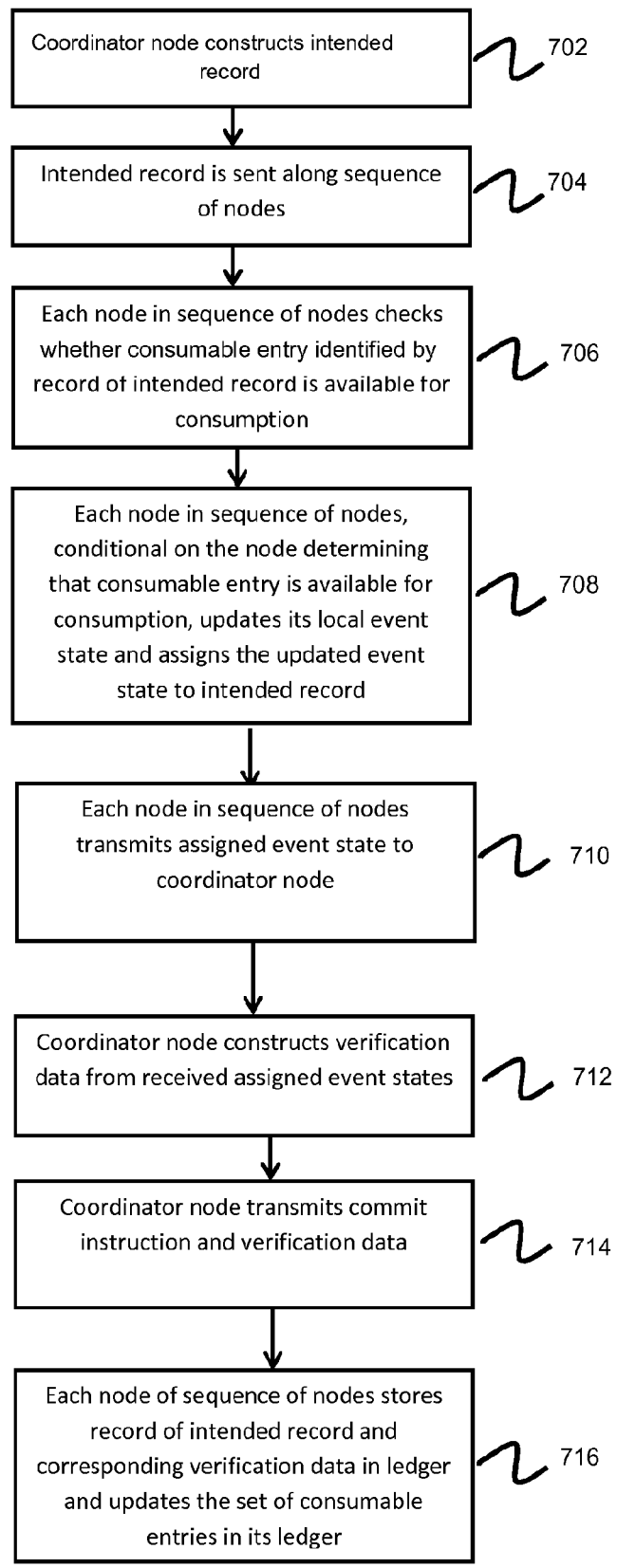
FIG. 14 shows an overview of a verification procedure for an intended record comprising a record intended for a distributed ledger for the second implementation.

FIG. 14 shows an overview of the verification procedure in the second implementation just described. The procedure is similar to the procedure described in FIG. 7, with the exception that the verification procedure now includes a check.

The Application Layer passes a record to the Ledger Layer. A coordinator node, for example node 102 of FIG. 1, at step 702 receives the record and constructs the intended record comprising the record intended for the distributed ledger, the verification coordinate comprising verification elements for use in the verification procedure, and the coordinator node ID. Unlike in the first implementation, the record data of the intended record comprises consumables data including a consumable entry ID. Also unlike the first implementation, the coordinator node 102 checks the record of the intended record to ensure that the consumable entry that will be consumed by the record's inclusion in the ledger is available for valid consumption. This involves the coordinator node 102 comparing the consumable entry identified by the record of the intended record to the set of consumable entries already stored in the coordinator node's ledger. If the coordinator node determines that the consumable entry is available for valid consumption (or, in other words, is unconsumed or unused), the coordinator node updates its local event state and assigns it to the intended record. The coordinator node also sets the verification coordinate and the coordinator node ID, as in the first implementation. The verification elements of the verification coordinate are the record ID, the coordinator node ID, the ID of the next node in the sequence (the node that the coordinator is going to send the intended record to), the event state that the coordinator node has assigned to the intended record, and a node count value which is the total number of nodes that will feature in the sequence. As in the first implementation, this number is defined for the ledger.

At step 704, the intended record is sent along the sequence of nodes in the network 100. As in the first implementation, each node selects the next node in the sequence to which it sends the intended record. If an indicator to confirm that the further node will participate in the verification procedure is not received within a defined time period, the node selects a different next node. At step 706, each node checks the record of the intended record to ensure that the consumable entry that will be consumed by the records inclusion in the ledger is available for valid consumption. This involves the node comparing the new consumable entry identified by the record of the intended record to the set of consumable entries already stored in the node's ledger. The check is performed by comparing the consumable entry ID of the record of the intended record with the IDs of the consumable entries stored in the node's ledger.

At step 708, each node, if it determines that the consumable entry is available for valid consumption (or, in other words, is unconsumed or unused), updates its local event state and, as in the first implementation, assigns it to the intended record. Each node then transmits to the coordinator node 102 at step 710 the event state it assigned 708 to the intended record. At step 712, the coordinator node 102 constructs verification data from the assigned event states it receives from the nodes of the sequence of nodes. As in the first implementation, this procedure is performed by the coordinator node aggregating the received verification coordinates.

At step 714, the coordinator node 102 transmits a commit instruction and the verification data it has constructed 712 for the intended record to each of the nodes of the sequence. As in the first implementation, the verification data comprises the aggregated verification coordinates received from each of the nodes in the sequence. The commit instruction can be sent along the sequence of nodes one by one or can be sent directly to the nodes in the sequence.

At step 716, nodes of the sequence then store the record of the intended record and the corresponding verification data in their respective copy of the distributed ledger. Each node also uses the new consumables data in the record to update the set of consumables entries stored in its ledger. The updated set of consumable entries will therefore indicate the change of ownership recorded by the newly added record.

Other nodes in the network may later update their copies of the ledger by way of the gossip protocol or related update procedure. This typically includes updating their own respective set of consumable entries.

Thus, it can be seen that the verification procedure performed for a new intended record in this second implementation is very similar to the verification procedure performed in the first implementation. The differences are that the procedure now includes a check to ensure that the consumable entry identified in the consumables data of the record of the intended record is available for valid consumption and the maintenance of the set of consumable entries to enable the check to be performed.

Figure 15:
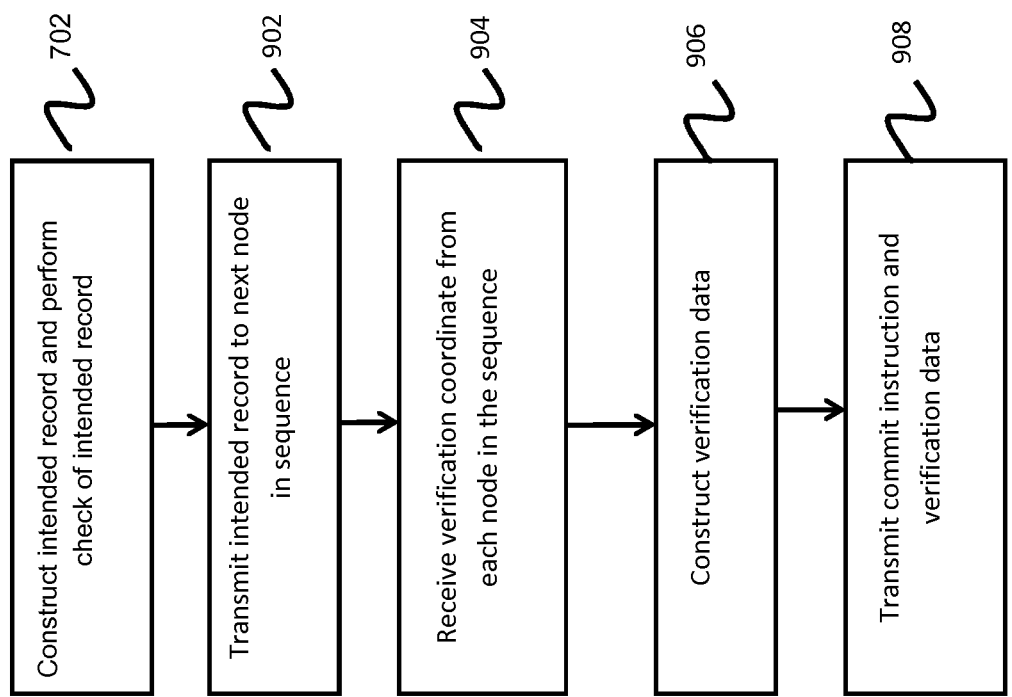
FIG. 15 shows a flow diagram depicting the verification procedure from the perspective of a coordinator node for the second implementation.

In this implementation, the digital signature of the current owner is also checked as part of the verification procedure. Digital signatures and the associated public/private key cryptography are well known in the art and will not be described in detail here FIG. 15 shows the verification procedure in the second implementation from the perspective of the coordinator node, after the coordinator node 102 has constructed the intended record and performed the check of the intended record. As can be seen by comparing FIG. 15 to FIG. 8, which relates to the first implementation, the coordinator node performs the same steps in both the first and second implementations with the exception that the second implementation includes a check at step 702 to ensure that the consumable entry that will be consumed by the record's inclusion in the ledger is available for valid consumption. The check is performed by comparing the consumable entry ID of the record of the intended record with the IDs of the consumable entries stored in the node's ledger. Additionally, in the second implementation, if a node in the sequence of nodes performing the verification procedure determines that there is a conflict, the coordinator node may receive an indication of this conflict from the node (not shown).

Figure 16:
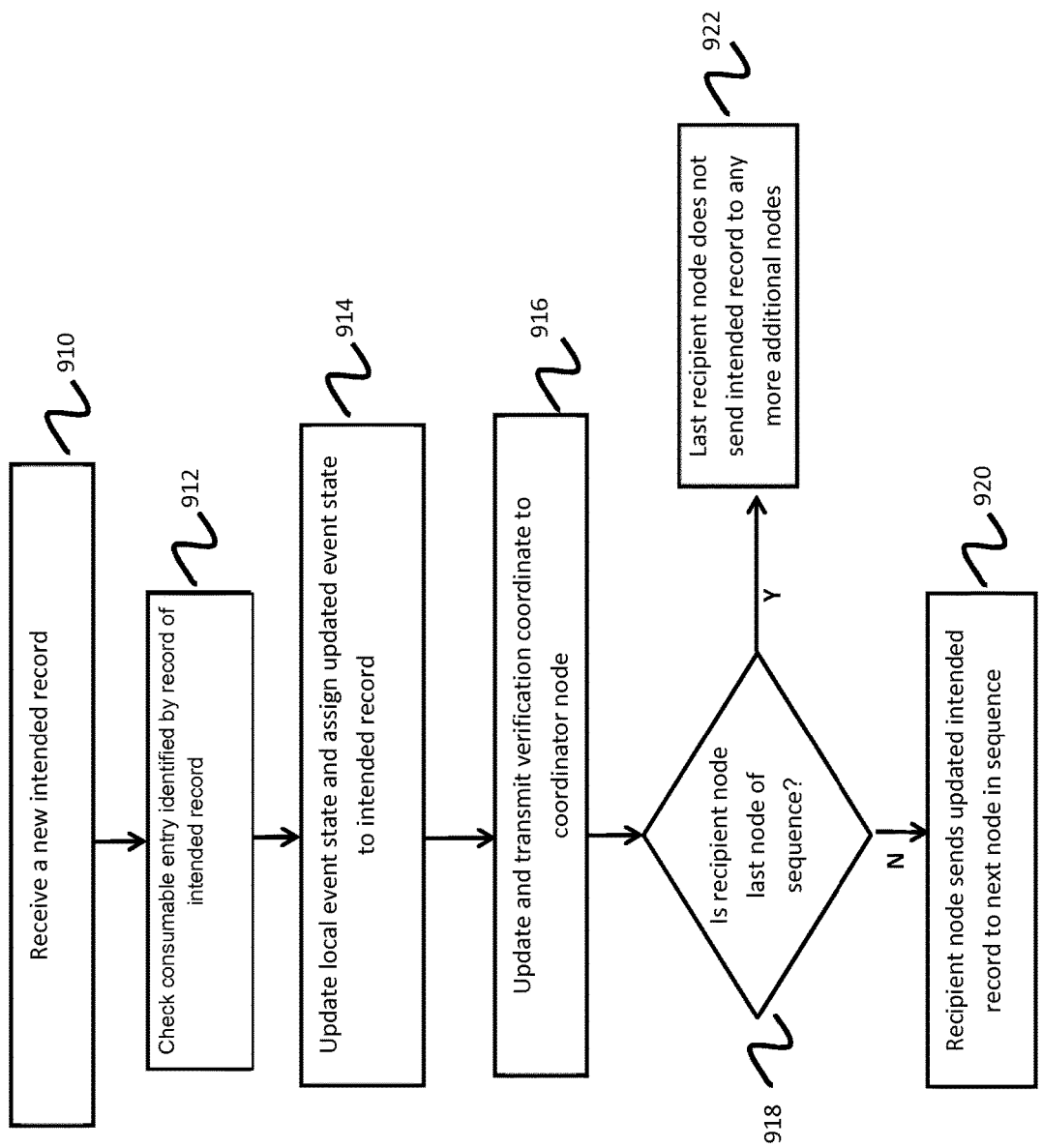
FIG. 16 shows a flow diagram depicting the verification procedure from the perspective of a node in the sequence of nodes performing the verification procedure for the second implementation.

FIG. 16 shows the verification procedure in the second implementation from the perspective of a node in the sequence of nodes. As can be seen by comparing FIG. 16 to FIG. 9, which relates to the first implementation, the node in the sequence of nodes performs the same steps in both the first and second implementations, with the additional step in the second implementation of checking the consumable entry identified by the record of the intended record (shown at step 912). The check is performed by comparing the consumable entry ID of the record of the intended record with the IDs of the consumable entries stored in the node's ledger or pending list.

The node may identify a conflict at step 912 and reject the intended record. This is not shown in FIG. 16 but will be described in detail with reference to FIGS. 17-20.

It is possible that the consumables data in the records of two different intended records identifies the same consumable association. That is, the two different records identify that the same consumable entry is to be consumed. This can occur through malfunction or as a result of an attempted double spend. In either case, a conflict arises. An aspect of the second implementation concerns a node determining that there is a conflict between intended records by performing a check.

Figure 17:
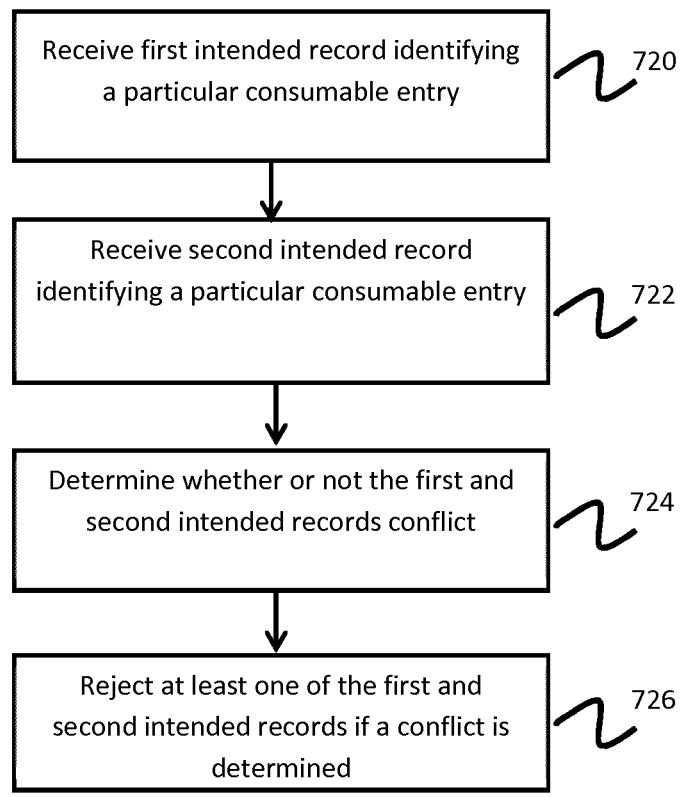
FIG. 17 shows a flow diagram of a procedure performed by a node to determine the presence of conflicting intended records for the second implementation.

FIG. 17 illustrates a procedure performed by a node to determine that there are conflicting intended records. This may occur, for example, if the node is taking part in the verification procedures of one or more of the intended records. The node stores intended records which it has received in a pending list of intended records for which the node is involved in the verification procedure but for which the verification procedure is not yet complete. When the node receives further intended records (as part of another verification procedure), these newly received intended records are checked against those already in the pending list, as well as against other records and the set of consumable entries stored in the node's ledger.

A conflict between an intended record just received and an intended record already in the node's pending list may therefore be determined. This determination is performed by comparing the consumable entry IDs of the records of the two intended records.

In any of these cases, the node may receive at step 720 a first intended record. The record of the first intended record identifies a particular consumable entry that is to be consumed. Then, subsequently, the node may take part in the verification procedure for a different, second intended record. During this procedure, the node receives the second intended record at step 722. The second intended record also identifies a particular consumable entry that is to be consumed.

If the first and second intended records both identify the same consumable entry that is being consumed then there is a conflict. In such a case, the node determines in its check at step 724 that there is a conflict between the first and second intended records. As the consumable entry can only be validly consumed once, only one of the conflicting records may be stored in the ledger. Storing both records in the ledger would constitute a double spend of the item associated with the twice-identified consumable entry. Therefore, responsive to determining 724 the conflict, the node rejects at step 726 the intended record it received later.

Figure 18:
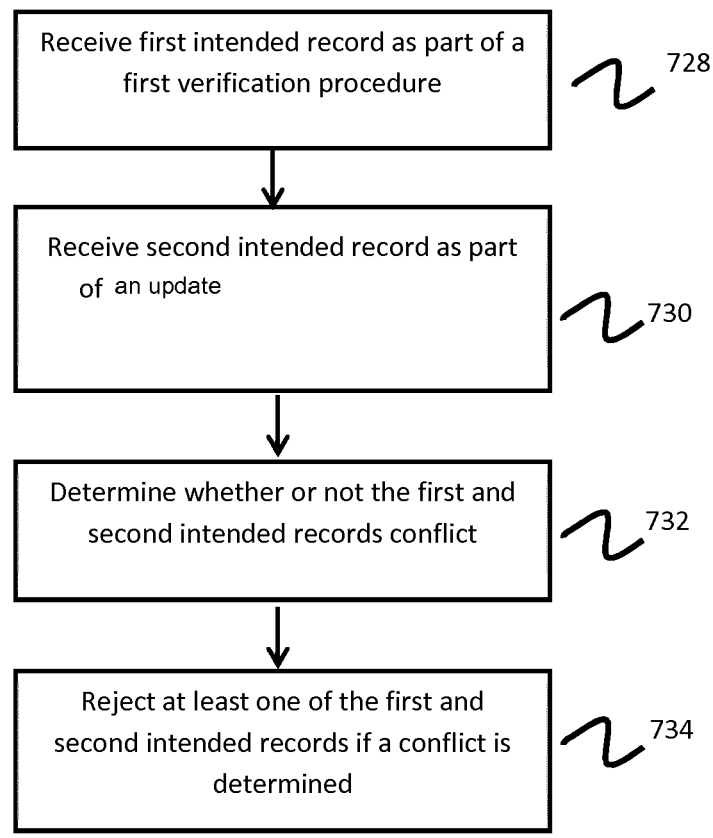
FIG. 18 shows a flow diagram of another procedure performed by a node to determine the presence of conflicting intended records for a variation of the second implementation.

In a variation, the node need not be taking part in the verification procedures of both conflicting intended records to determine a conflict. An aspect of this variation relates to the node taking part in the verification procedure of only one of the two conflicting intended records. FIG. 18 shows a process performed by a node in such a scenario.

At step 728, the node receives a first intended record during the verification procedure of that record, identifying a particular consumable entry that is to be consumed by inclusion of the first record in the ledger. Then, subsequently, the same node receives at step 730 a second intended record from another node. The second record also identifies a particular consumable entry that is to be consumed by inclusion of the second record in the ledger. This second intended record can be received as part of an update via a gossip protocol, for example, and the node receiving the second record is in this instance not taking part in the actual verification procedure for the second intended record and therefore does not update its local event state upon receiving the second intended record.

Nevertheless, the node receiving the two intended records may determine at step 732 that there is a conflict between the first and second intended records, because the records of both intended records identify the same consumable entry to be consumed. This determining is performed by comparing the consumable entry IDs of the two records of the intended records. Responsive to this, the node rejects at least one of the first and second intended records at step 734. In this variation, the node rejects the intended record that was received later by the network of nodes.

As the node is not taking part in the verification procedure of the second intended record, the node does not update its local event state or assign an event state to the second intended record, in this implementation. The node may however inform the second node, from which it received the second intended record, that it has discovered a conflict. The second node may then report to the coordinator node for the second intended record that there is a conflict. In this way, the system does not rely solely on the nodes in the actual sequence of nodes performing the verification procedure to determine a conflict. Any node which receives an intended record, through updates, gossip protocols or other means, can determine a conflict between two intended records.

Figure 19:
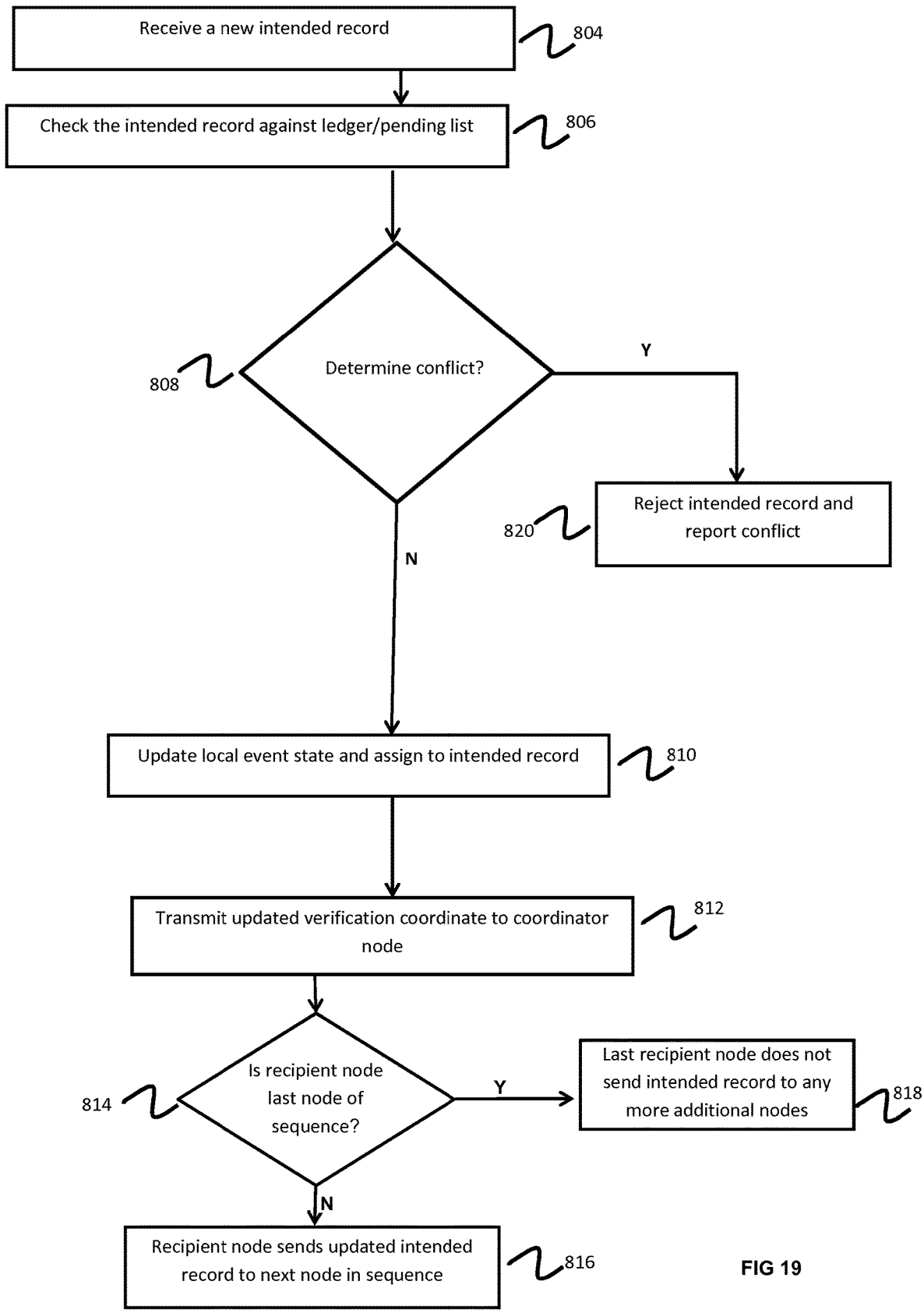
FIG. 19 shows a flow diagram of the verification procedure for a new intended record for the second implementation.

FIG. 19 shows an overview of the method performed by each node in the sequence of nodes when they receive an intended record for the second implementation. The method shown in FIG. 19 for the second implementation is similar to the method shown in FIG. 9 for the first implementation, but with functionality relating to consumables data and consumable entries also included. Referring to FIG. 19, a node 104 receives the new intended record at step 804.

The node 104 then checks at step 806 the record of the intended record against the ledger and/or its pending list to determine whether not there is a conflict. As described previously, this comprises the node checking whether or not the consumable entry identified by the consumable data in the record of the intended record is actually available for valid consumption.

If the node determines a conflict at step 808 between the new intended record and an intended record in its pending list, the node rejects the intended record which was received later and reports the conflict at step 820. If the node determines a conflict with a record already in the ledger, the node rejects the intended record. Reporting may be to the coordinator node 102 or any other node. The check is performed by comparing the consumable entry ID of the record of the intended record with the IDs of the consumable entries stored in the node's ledger or pending list.

If the node 104 does not determine a conflict, the node 104 updates at step 810 its local event state and assigns it to the intended record. The process then continues in the same way as in the first implementation.

The node 104 transmits at step 812 its verification coordinate to the coordinator node 102 in the same way as described with reference to the first implementation. The coordinator node 102 maintains a record of which nodes have checked the record of the intended record. The coordinator node 102 also maintains a record of the event states assigned by each node to the intended record. This enables the coordinator node 102 to construct the verification data as described with reference to the first implementation.

As in the first implementation, the number of nodes that have received the intended record is monitored by each node incrementally reducing (or increasing in a variation) the node count value used in the verification coordinate.

A check is made at step 814 to determine if the node 104 is the last node required in the sequence of nodes. If the node 104 determines it is not the last node of the sequence, at step 816 the node 104 sends an updated version of the intended record (comprising the updated verification coordinate) to the next node 106 in the sequence. When node 104 transmits to node 106, the ID of the sender node in the updated node sequence data will be the ID of node 104, and the ID of the receiver node will be the ID of node 106. The event state assigned by node 104 to the intended record will be the local event state of node 104 when it received the intended record.

Upon receiving at step 804 the intended record from node 104, the next node (node 106) then performs steps 806-810. If node 106 does not determine a conflict and is also not the last node of the sequence, node 106 performs steps 812 to 816. This process repeats until the pre-determined required number of nodes has consented to the inclusion of the intended record in the ledger. This is indicated by the node count value reaching the pre-defined value, such as 0. At this point the last node in the sequence transmits the usual information to the coordinator node 102 but, as shown by step 818, does not send the intended record to any further nodes.

In a rare case, despite the above-described functionality, some conflicting intended records that identify the same consumable entry to be consumed may evade detection during the verification procedure of the intended records. This may happen, for example, if the conflict is not detected by the processes that have already been described because no single node is in a position to identify the conflict while the verification procedure is being performed. In these cases, the conflicting intended records may both pass the verification procedure without the conflict being detected. The records of both intended records will therefore be added to the ledger (in different locations i.e. different local copies), and a double-spend will occur. In light of this possibility, a further aspect of the second implementation concerns retroactively removing conflicting records, even if they have passed the verification procedure. This functionality is described in FIG. 20 and enables the retro-active resolution of double spends.

Figure 20:
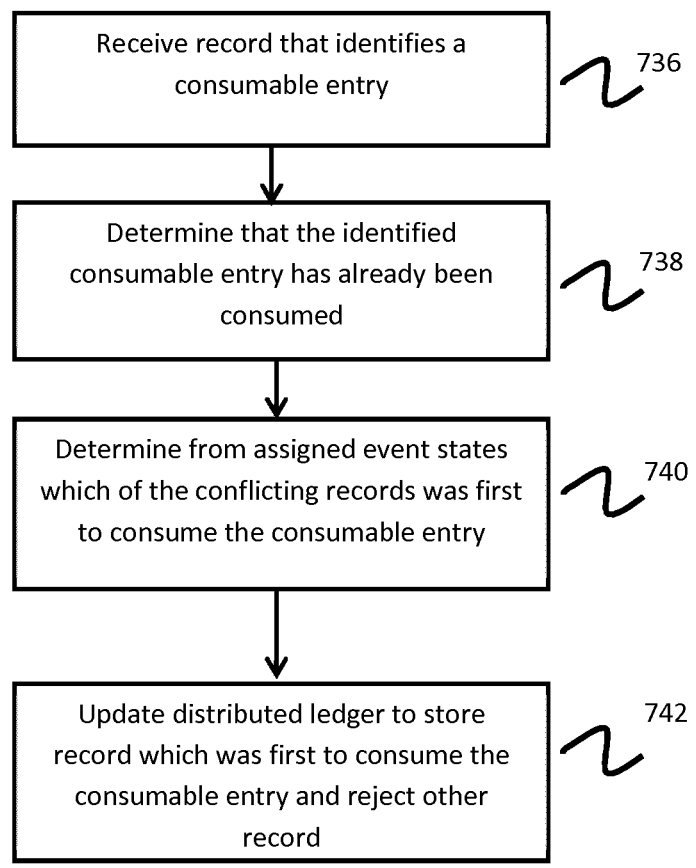
FIG. 20 shows a flow diagram of a procedure performed by a node to determine the presence of conflicting records for the second implementation.

Referring to FIG. 20, at step 736, a node receives, from another node in the network, a record and verification data for that record. This may happen, for example, as part of an update procedure whereby the node receives records and related data that may be missing from its ledger, due to the node having been offline, for example.

The verification data for the record identifies the sequence of nodes in the network which received the intended record during a verification procedure, and the respective event states assigned by each node of the sequence of nodes to the intended record during the verification procedure.

The record comprises consumables data identifying a consumable entry that was consumed by the inclusion of that record in the ledger. The node may compare this consumables data to the set of consumable entries already stored in the node's ledger. When the node performs this comparison, the node may determine at step 738 that the consumable entry identified by the received record has already been consumed in its ledger (i.e. it has been consumed by another record). This determining is performed by comparing the consumable entry IDs of the two records. In this case, the node has determined that there is a conflict between two records written to different parts of the ledger. In other words, a double-spend has occurred and a conflict in the distributed ledger exists.

This conflict can be resolved at step 740 by determining which of the conflicting records was received by the network of nodes first. This can be determined by comparing the event states assigned to the record by nodes of the networks. As described above, event states can be assigned to records when they are contained in intended records undergoing verification procedures. Event states can also be assigned to records when they are received during an update or via a gossip protocol, for example. Event states assigned through either of these processes may be used to then determine the causal ordering of when records or intended records were received by particular nodes. It can then be determined which of two conflicting records was submitted to the network first.

Once it has been determined which record was received first, the distributed ledger can be updated at step 742 to store only that record, and reject other conflicting record(s) which were received later.

How a node determines which of the two records was received first by the distributed ledger will be described with reference to FIG. 21.

Figure 21:
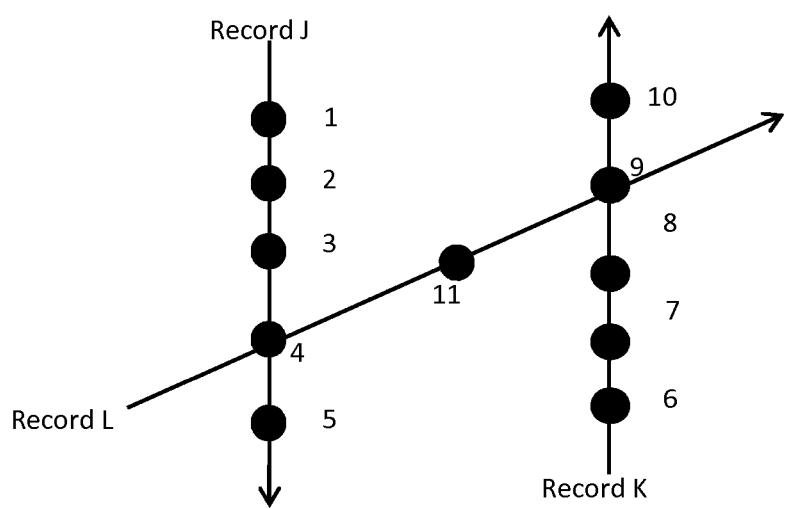
FIG. 21 shows the sequences of nodes which performed verification procedures for three records.

FIG. 21 shows the path that two records took through a network during their respective verification procedures. Record J was verified by nodes 1-5, and Record K was verified by nodes 6-10. Each of the two records, Record J and Record K consumed the same consumable entry, and therefore conflict with one another. However, as there is no common node that has received both records during their respective verification procedures, nodes 1-5 will verify and accept Record J and nodes 6-10 will do the same for Record K. Verification data for each record will be stored in the respective copy of the ledger, as has already been described in detail. At some stage after this a conflict may be detected. For example, if node 5 sends an update to node 6 containing Record J, node 6 will be able to identify the conflict.

In this case, the conflict is resolved by using the verification data for the records to discover a record that was received by at least one node in each set of nodes 1-5 and 6-10 during the respective verification procedure for that third record. In FIG. 21, Record L was received by a node from each set (nodes 4 and 9 respectively) during its verification procedure. In this situation, the conflict between Records J and K can be resolved if the verification data for the records shows that the following criteria concerning record L is met:

(i) Record J, when part of its intended record and during the associated verification procedure, was received by node 4 before Record L, when part of its intended record and during the associated verification procedure, and Record L, when part of its intended record and during the associated verification procedure, was received by node 9 before Record K, when part of its intended record and during the associated verification procedure;

or (ii) Record J, when part of its intended record and during the associated verification procedure, was received by node 4 after Record L, when part of its intended record and during the associated verification procedure, and Record L, when part of its intended record and during the associated verification procedure, was received by node 9 after Record K, when part of its intended record and during the associated verification procedure.

In case (i), Record K was received by the network later and may be rejected. In case (ii), Record J was received by the network later and may be rejected.

There remains a rare instance for records which transfer consumable associations (e.g. using consumable entries), in which conflict resolution may not be possible in the manner described above which the described implementations and their variations may use. This is where a record such as Record L does not exist. In other words, no record that satisfies either criteria (i) or (ii) exists. In this case, an alternative method is provided to determine which of the conflicting records should be included in the ledger. These rare cases will generally only occur due to either i) a carefully constructed conflict manually created and presented by a malicious actor or ii) a critical failure of all or part the underlying networking infrastructure (for example if a deep sea internet cable is severed).

In this rare instance, reputation weights of the nodes that took part in the verification procedure for each conflicting record are compared to determine whether Record J or Record K is rejected. This process will now be described.

A static time value for each consumable association or consumable entry is maintained. The static time value increases in dependence on the length of time that the consumable association or consumable entry remains unconsumed (unused). That is, the static time value is a product of the amount of time a particular consumable has been static. Nodes increase their reputation each time they take part in the verification procedure of an intended record, in which the inclusion of the record of the intended record in the distributed ledger consumes a consumable association or consumable entry. The reputation increase received by each node in a particular example is equal to STV/n, where: STV is the static time value that has built up for the consumable association or consumable entry consumed by the inclusion of the record of the intended record in the ledger; and n is the number of nodes that performed the verification procedure for the intended record.

A reputation weight for each node therefore builds up over time, as it takes part in verification procedures for intended records that are committed to the ledger. The reputation weight of a node can be calculated directly from the data in the ledger. Alternatively, to improve performance and efficiency, a list of reputation weights of the nodes in the network can be maintained by a node.

To determine whether Record J or Record K is rejected, the respective reputation weights of all the nodes involved in the verification procedure of each record respectively is summed in this particular example. The record with the highest amount of reputation weight from its verification nodes is the one that is accepted, while the other is rejected. It will be apparent that this functionality can be used to determine which record is accepted and which are rejected for any number of conflicting records.

In a more detailed example, when a consumable association or consumable entry is consumed, in part or in full, the static time value for the consumed entry is allocated to the nodes that performed the verification procedure. The static time value for the new consumable association or consumable entry that is created is set to 0. In this example, the static time value is optionally capped. This prevents excessive reputation generation on a single consumable association or consumable entry. In this example, the static time value is also optionally an exponent function, for example an inverse square root or inverse logarithm function. This guards against Sybil attacks and "reputation" spamming. For example, if a cap of 100 over 10 days is used with an inverse square root function, a static time of 1 day would produce a static time value of 1, a static time of 2 days would produce a static time value of 4, a static time of 3 days would produce a static time value of 9, a static time of 4 days would produce a static time value of 16 . . . a static time of 9 days would produce a static time value of 81, and a static time of 10 days or over 10 days would produce a static time value of 100.

As can be seen, functionality to determine relative ordering between conflicting records is provided.

A second implementation has been described in detail and some variations have also been described. In another variation, a coordinator node is not used and the intended record does not comprise the coordinator node ID. In this variation, the verification data is built up as the intended record is passed along the sequence of nodes. That is, each node adds a verification coordinate to the intended record until the last node in the sequence has an intended record which comprises the whole verification data. The last node can then transmit the verification data and commit instruction to all of the nodes in the sequence or the verification data and commit instruction can be passed along the sequence. In another variation, each node in the sequence of nodes can perform a check of the record of the intended record during the verification procedure, for example for compliance with format, content or other criteria. In this variation, the commit instruction is not sent if a node reports that the check of the record has failed and the record is not stored in the ledger. Other variations are described in relation to the other implementations and at the end of the detailed description.

A third implementation relates to recording payments using digital currency. The third implementation operates in the same ways as the second implementation, with the additional feature that the consumable association or consumable entries in the third implementation may be divisible. This means that the consumable association or consumable entries in the third implementation may be used to process payments where amounts of digital currency can be split into smaller amounts or combined into larger amounts. The third implementation therefore enables an entity to receive change from an amount of currency stored as a consumable association or consumable entry where part of that amount is spent (transferred to another entity) and the remainder is returned to them. In other words, the original amount is divisible and can be divided into the two parts.

The ledger for the third implementation (not shown) is similar to the ledger of the second implementation shown in FIG. 11, including the presence of the consumables data. The consumables data is application specific. In the third implementation the record and therefore the consumables data contained in records relates to a payment of digital currency. In the third implementation the record consumables data comprises: the payer ID, the payee ID, the amount of currency being paid and the currency.

A set of consumable entries for the third implementation is shown in FIG. 22. The set of consumable entries indicates that entities G, H and I, which in this implementation are bank account owners, each own 10 units of digital currency. Owners J and K each own 20 units of digital currency. As in the second implementation, the status indicator column shows that they are currently still the owners of these amounts of digital currency.

Owner G may wish to pay owners H, I, J and K 2 units of currency each. These transactions may be stored in a distributed ledger through the inclusion of a new record, as in the second implementation. However, in the third implementation, a single consumable entry, Consumable Entry #0007, is divided into five new consumable entries. Consumable entries #0013-0016 indicate that 2 units of currency have been sent to each of owners H-K. Another consumable entry, #0012, indicates that 2 units of currency have been sent back to owner G. This is because, from the initial 10 units of currency associated with Consumable Entry #0007, owner G retains 2. G has effectively received 2 units in change from the transaction.

The updated set of consumable entries after this transaction occurs is shown in FIG. 23. As can be seen from FIG. 23, Consumable Entry #0007 has been consumed and has effectively been divided into five new consumable entries, #0012-0016.

This process can happen in reverse, where multiple consumable entries relating to small amounts of digital currency can be consumed and combined into a single consumable entry relating to a larger amount of digital currency. For example, the set of consumable entries shown in FIG. 23 indicates that owner H now owns 12 units of currency in total. Owner H could therefore send 12 units of currency to a different entity, by consuming consumable entries #0008 and #0013 and combining the items described therein in a new consumable.

In a simpler example, a single consumable entry is divided into two parts, one for the party being paid and the other as change for the paying party.

In a variation, the consumable entries relate to multiple currencies. In this variation, the consumable entries also contain an asset ISO identifier (e.g. GBP, USD, XBT). The consumed consumable entry and the new consumable entry created may be in different currencies, thereby enabling currencies to be exchanged. In a variation, one or more new digital currencies are used.

It will be apparent from FIGS. 22 and 23 that the total account balance of an entity can be easily determined from the set of consumable entries.

In a fourth implementation, a generic, versatile record structure is available in the ledger layer. The same verification procedure and general ledger structure as that already described is used. The generic record structure comprises record data comprising sequence length, participant(s), payload, timestamp, signer(s), signature(s), consumer(s), consumable(s). In this generic implementation the sequence length defines the length of the sequence of nodes. The participant(s) define the addresses (derived from the respective public key) of all parties involved in the records action and will be informed of the event. This information helps the network route the records across the correct partitions and nodes so that all parties have a better chance of seeing the record immediately. It's also used to encrypt payloads in most cases. Payload can be any user data such as text, images, pdf documents etc. The payload is typically encrypted so that only participants can access it. Timestamps are user provided. The network does not require them. The timestamps serve as a convenience field so that viewers of the record have an approximate time when the event may have happened. signer(s) and signature(s) define the required signers and store the signatures, respectively. The consumer(s) and consumable(s) are consumables data. The consumer(s) identify one or more consumable entries that are consumed by the record. The consumable(s) provides the data which is used to create one or more new consumable entries. The consumable(s) may themselves comprise one or more of signer(s), signature(s), participant(s), timestamp(s) and a payload. With consumable(s), only a signer need be included and serves as an owner identifier, but no signature is needed. A consumer on the other hand has no signer but does have a signature. The nodes uses the signer (owner) from the consumable that the consumer is using, and validates that the signature included with the consumer is valid for that signer (owner) and therefore has the authority to spend. Consumable(s) can have multiple signers and thus owners, and can specify a requirement of a of b signatures in the consumer to use them.

Any one or more of the field in the generic record structure may be used and set by the application layer for an application-specific implementation.

The preceding description has set forth implementations and some variations. Some further variations will now be described. As was mentioned at the beginning of the detailed description, the features of the different implementations and those of the variations (both those described already and those about to be described) are not mutually exclusive. Rather, the features of all implementations and those of the variations can be used with one another.

The described implementations have focused on certain applications. Other applications include, but are not limited to, administrative procedures such as tax collection, issuing licences, administrating social security benefits and voting procedures, artwork ownership, finance, music and entertainment, diamond and precious assets, the internet of things, and supply chains of various commodities. The described distributed ledger technology is in no way limited in its application.

The features of the above implementations can readily be applied to records pertaining to a wide variety of items. These include, but are not limited to, property ownership, financial transactions, contracts and data. The features described herein can be used to prevent double-spends and resolve conflicting ownership claims. They can be used to verify an agreed order of events, and provide a means of providing a tamper-proof ledger of records by virtue of the hashing functionality described above. The use of digital signatures in consumables ensures that only the true owner of the consumable can consent to its consumption.

It will further be appreciated that the consumable may comprise other data specific to the required functionality. For example, an indication of whether or not the item referred to by the record is divisible may be contained. In the case of an art item, this would read "false", unless some form of joint-ownership agreement had been reached. In the case of financial transactions, the divisible column may often read "true", because financial transactions are generally divisible into smaller units of currency.

In a variation of the described implementations, each node in the sequence of nodes may digitally sign the data it produces (the verification coordinate). This ensures that any tampering with the data will be prevented, or at least be detectable. This, for example, prevents a malicious node, e.g. the coordinator node, from altering the data it receives from a node or nodes in sequence of nodes.

It is possible for nodes to maintain only a part of the ledger or even none of the ledger and in a variation of the described implementations not all nodes maintain the entire ledger. In this variation, a node can only perform a check against the part of the ledger which it maintains. However, a node can still feature in the sequence of nodes without performing the check or ultimately storing the record. That is, a subset of the sequence of nodes may only perform the checks that have been described. Nodes store data identifying which parts of the ledger at least a subset of the other nodes maintain. This enables nodes to forward the intended record during a verification procedure to a node that is maintaining the relevant part of the ledger. Also, this enables a group of nodes each maintaining part of the ledger to combine their data to provide the entire ledger. Depending on the application, some intended records may only need to be checked against certain parts of the ledger. Some nodes may not maintain any part of the ledger. These nodes cannot therefore check intended records against records of the ledger. However, these nodes may be able to partially check intended records to ensure that they comply with certain pre-defined criteria.

The ledger may be split up into partitions. Users of the system may have accounts. A unique identifier for the account such as a public key can be used to associate each account with a corresponding part of the ledger. The unique identifiers can be grouped into groups of identifiers i.e. the accounts can be grouped into groups of accounts. Each group forms part of the ledger or, in other words, the ledger is partitioned into partitions wherein each partition comprises the records for a group of accounts.

In this variation the grouping or partitioning is achieved by taking a truncated 64-bit integer of the 256-bit public key of each account and performing a modulo operation on this truncated number to assign it to one of the partitions of the ledger. As well as users having accounts, each node may be given a public/private key pair and may have an account. It will be apparent that any deterministic method of assigning records to specific partitions may be used. Other identifiers that identify accounts may be used, and public keys and truncations thereof may be of other bit lengths.

Accordingly, an aspect of this variation provides a computer-implemented method for performing by a node of a network of nodes for maintaining at least part of a distributed ledger maintained by the network of nodes, the method comprising: maintaining at least part of the distributed ledger, wherein the at least part of the distributed ledger is configured to store records and associated verification data for the records, wherein the verification data for a record identifies: (i) a sequence of nodes in the network which received the intended record during a verification procedure; and (ii) the respective event state assigned by each node of the sequence of nodes to the intended record as an event state during the verification procedure; wherein unique identifiers for accounts with the ledger associate each account with a corresponding part of the ledger.

It can be seen that by partitioning in this way, each user's account will reside in one of the partitions. Nodes that maintain the relevant partition can be used to support a user's account. Nodes can participate in the network by maintaining one or more partitions. This is a huge improvement over existing systems which require nodes to store the entire distributed ledger, as opposed to certain relevant sections.

A node may receive during an update only those records relevant to its partition. This greatly reduces storage and bandwidth loads on the node because all other partitions can effectively be ignored. Nodes providing the update will also know which records to send to which nodes, because nodes receiving updates will only be interested in receiving records relevant to the partitions they are associated with or partitions they store. This is in contrast to block chain where all records are sent to all nodes during updates. Partitions further enable easy look-up of records relating to a particular owner. This presents yet another departure from the status quo, which requires scanning the entire ledger to find those transactions or records relating to a given user.

A node may broadcast to other nodes of the network which partitions it is storing, and therefore which records are relevant to the node and which intended records can be verified by the node. Nodes may store, for example in caches or in metadata, a list of nodes and which partitions each respective node in the list is storing. This list can be updated responsive to new broadcasts from nodes concerning which partitions they are storing. In implementations where nodes store partitions, intended records will be assigned to particular partitions. This assigning may be done through, for example, modulo functionality of the sort already described.

Nodes can determine from the data of the intended record which partition the intended record relates to.

In implementations where nodes store partitions, nodes are only able to perform the check of the intended record against the records in the ledger, described in relation to the second, third and fourth implementations, if they store the partition relevant to the intended record being checked. A node which stores the relevant partition and is therefore able to perform the check of the intended record can be considered as being able to perform a full verification procedure for the intended record.

A node which does not store the partition relevant to the intended record is not able to perform the check of the intended record. However, the node may still update its local event state and assign the updated event state to the intended record. The node can also verify other aspects of the intended record not relating to checking the ledger, for example the structure of the intended record. The node is therefore still able to partially take part in the verification procedure for the intended record, and the node is still a node in the sequence of nodes which receives the intended record and transmits the event state it assigns to the intended record to the coordinator node. A node of this kind which is not able to perform the check of the intended record but is still a node in the sequence of nodes in the verification procedure can be considered as being able to perform a partial verification procedure for the intended record.

As described, nodes can determine which other nodes store the partition relevant to an intended record by consulting their list of which partitions are stored by each node. During verification procedures for intended records, nodes will use this information to send the intended records to other nodes of the network that store relevant partitions, when possible. In other words, intended records are preferentially sent to nodes that can perform full verification of the intended record.

In the case that a node cannot find in its list another node storing the partition relevant to an intended record, the intended record must be sent to a node that can only perform partial verification on the intended record. In a variation, nodes which only perform partial verification for an intended record do not increment the node count of the verification coordinate of the intended record. In another variation, a minimum number of full verifications, that is verifications by nodes which store the partition relevant to the intended record, may be required before the intended record is successfully verified.

In the first implementation, nodes update their event state on receiving a new intended record, and in the second, third and fourth implementations on determining that the consumable entry identified by the record of the intended record is available for valid consumption (use). In variations, the event state can be assigned at any time after receiving the intended record. In one variation, nodes update and assign their event states upon transmitting the intended record, the node sequence data and/or the event state. In another variation, nodes update and assign their event state midway through the verification procedure (between receiving and sending the intended record). In another variation, as in some of the described implementations, the node receives an intended record and checks the pending list and the ledger for a conflict before assigning the event state to the received intended record. If the received intended record conflicts with one that is in the pending list or ledger, the node rejects the received intended record and never assigns it an event state.

In another variation, to achieve the same result, an event state may be assigned to a received intended record and if a conflict is identified the event state can be unassigned from that intended record and the intended record rejected. The same event state can then be assigned to the next intended record.

The stack model of FIG. 2 is conceptual. It shows how the same architecture can be used for different applications. It is not necessary that this model is used. Dedicated, application specific implementations may be made.

The architecture of the computer node or user computer may vary considerably and the architecture of FIG. 3 is only one example. Computers A and/or B of FIG. 1 may form part of the network 100 and may play an active role in storing and maintain the distributed ledger.

Nodes can take part in the network maintaining the ledger even if they only maintain a part of the entire ledger. Nodes may also form part of the network 100 and even take part in some of the verification procedures associated with the distributed ledger, without actually storing a respective copy of any of the distributed ledger. It is not essential that all nodes in the network maintain a complete copy of the ledger.

The described implementations use logical clocks to provide causally complete event states. Other suitable logical clocks may be used. In the case where counters are used, any suitable incremental event counting mechanism could be used. The clocks may not necessarily use incremental counting mechanisms, and instead may use compact state representations such as Merkle trees or a combination of both. In one variation, a variant of a Lamport clock which includes a checksum value representing all of the records that a node has received at that time is used. The checksum is commutative so that adding and/or removing records from it does not destroy the integrity of the checksum itself, in other words the checksum is used like a Merkle Tree hash. The event states assigned by the node to received intended records and records in the first implementation are therefore logical event clock count values or, more specifically, Lamport clock values including a checksum.

Although not necessary, in the described implementations all logical clocks are initially set to zero. In variations, different initial settings may be used.

Updating the event states on receipt of the intended record as described in relation to the first implementation is not necessary. For example, the update could be performed after an intended record has been verified and the next received intended record could be assigned the new updated event state. Or, for example, the updating of the event state and assignment could be performed part way through the processing of the intended record.

The verification procedure may further comprise checking the intended record for one or more defined criteria. For example, the format of an intended record being processed may be checked for compliance with defined formatting requirements.

There are many alternative ways of identifying records, and using hashing is not essential.

Nodes may update their ledgers in a variety of ways instead of or as well as through using a gossip protocol. Updates may be required after a node has been offline for a period of time, or when a new node joins the network. Variations do not use a gossip protocol. For implementations using a gossip protocol, using, a node sequence length with $\log(n)*3$ event states, where n is the number of nodes in the network, is efficient. For implementations not using a gossip protocol, using a node sequence with $(n/3)+1$ event states is efficient There may be further data associated with the intended record, and these further data may be included in the verification coordinate.

In the second, third and fourth implementations, once a node in the sequence of nodes has processed the intended record in the way described above, the intended record is held in a pending records list by the node until a commit instruction for that intended record is received. In a variation, the record of the intended record may be deleted after processing by a node of the sequence. In these cases, the intended record or the record may be included in the commit message from the coordinator node.

In a variation, the verification procedure may require each node of the sequence of nodes to sign the verification coordinate sent to the coordinator node. These signatures may be digital signatures, and this process provides a secure way of ensuring that each node has consented to the intended record.

In the second, third and fourth implementations, the coordinator node is the first node in the sequence of nodes and performs all of the checking steps described in relation to determining whether relevant consumables can be validly consumed. It will be apparent that this is entirely optional, and the coordinator node 102 may perform only some or perform none of the checking steps.

Procedures in the Application Layer as opposed to the Ledger Layer, may construct the intended record and initiate the verification procedure.

In the described implementations nodes in the sequence may send a confirmation back to the previous node that they have received the intended record. If no confirmation is received within a predetermined time period the previous node may send the intended record to another node.

In variations of the second, third and fourth implementations, not all nodes in the sequence need to perform the check for a conflict. It is possible to have a sequence where only a subset of the nodes perform the check. The node path can be defined in relation to the number of nodes that perform the check.

In the described variations, the intended records contained a verification coordinate comprising verification elements which was updated by nodes of the sequence of nodes performing the verification procedure for the intended record. The verification coordinates were then sent to the coordinator node and used to construct verification data for the record. It will be apparent that this functionality may be replicated during the verification procedure through other means that do not involve a coordinate. In other words, verification data for records may be constructed without the use of a coordinate during the verification procedure. That is, a coordinate is not necessary. Variations use a data structure comprising verification elements. The verification elements comprise at least the sender node ID, the recipient node ID, the sender node assigned event state, optionally the record ID, optionally the node count. These verification elements may be provided in any suitable data structure. The coordinate is an implementation specific example of a suitable data structure.

The records in the second, third and fourth implementations were described without reference to a payload. However, this is application-specific and the records do not need to have a payload. The record data may comprise consumables data and no payload. The record data may comprise a payload and consumables data, for example when a message such as a reference number (the payload) accompanies a payment made using consumables data.

Some or all nodes may use caching to hold a set of consumable entries and/or pending intended records in order to increase efficiency and performance.

The ledger in the second, third and fourth implementations may be used to record the transfer of ownership of some good, commodity, right or service, sometimes in exchange for some other good, commodity, right or service In the description of the second, third and fourth implementations, the status of consumable entries was updated using "Yes" and "No". It will be apparent that this is implementation specific and any means of differentiating a consumed consumable entry from an unconsumed consumable entry can be used.

While all entities in the described implementations were owners, this need not be the case. An entity may be anything associated to or having a relationship with an item, such as an assignee, participant, allocation, role, responsibility and so on.

There are alternative ways of keeping track of the number of nodes that have received the intended record. In a variation, the node count value may only increment upon a node successfully verifying (or not determining a conflict), as opposed to on receipt of an intended record.

In the second, third and fourth implementations, unlike the first implementation not involving consumable entries, nodes of the sequence performing the verification procedure check the intended record before it is included in the ledger. Therefore, in these implementations, the verification data can be thought of as consensus data. Positive verification can be considered indicative that the sequence of nodes has each checked the intended record for discrepancies against their own copy of the ledger and consented to the inclusion of the record in the ledger. Therefore, after not determining a conflict, the node performing the check may transmit a consent indicator to the coordinator node, or to any other node. Alternatively, if the node does determine a conflict, it may transmit a non-consent indicator to the coordinator node, or to any other node.

In some implementations, only a subset of nodes may perform the check during the verification procedure of an intended record. A pre-determined number of nodes, or percentage of nodes in the network, may be required to perform a check for any given intended record, before it is included in the ledger. By requiring a high enough number of nodes to check a new intended record, and given a sufficiently long period of time, generally in the order of seconds, the chance of a conflict going undetected tends to zero as a result of information spreading through the network via gossip.

Divisible consumable entries, such as those described in relation to the third implementation, may be used to record shared ownership agreements, wherein an item is partly owned by many owners. Examples include shared ownership of houses, artwork, shares in businesses etc.

In a variation, a coordinate time value (e.g. a UTC time value) of when the node received the intended record can also be assigned to the intended record and stored in the verification data. More particularly, the respective coordinate time value is included in each coordinate. The coordinate time value can be used to ascertain the order in which records were received. If the records relate to documents, such as legal documents, the disclosed methods can clearly provide important advantages, for example in the legal and financial sector, where the determining the order in which documents arrived is important.

In the described implementations, each node in the sequence of nodes selects the next node to which the intended record is sent in the verification procedure. In this way, the path that the intended record takes can be considered as a random path. Or, in other words, the resulting sequence of nodes can be considered a random sequence. In variations, different ways of selecting the next node may be used.

In a variation, the records may be considered as "events".

In a variation, the sequence starts and ends at the same node.

In a variation, the consumable associations/consumable entries associate an entity with a one-time use token or coupon.

Any suitable computer programming language may be used in various implementations. Some implementations use the Scala language, which will run on any electronic device supporting a Java Virtual Machine.

In various implementations, power requirements are extremely low when compared to known ledger technologies, both in terms of electrical power and processor speed. An electronic device that is able to act as a node in various implementations includes a computer, a smart phone or even a Raspberry Pi.

Where user accounts are used, the data related to the user can be stored locally on a user device and used to construct intended records. In a variation, rather than storing the data on a user device the data can be obtained from the ledger, e.g. by a query search.

The consumable entry may comprise a status indicator indicating whether or not the consumable entry has been consumed. In a variation, the consumable entry may not comprise a status indicator, and consumption can be detected via associations and audits. That is, consumption of a consumable entry can be determined purely by looking at records in the ledger or pending list and determining if a more recent entry relating to the same item associated with a new entity exists.

In a variation, old records which have consumable associations (in some implementations consumable entries) that have been consumed are deleted. Advantageously, this reduces storage requirements.

The described methods may be implemented using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

The word "assigning" as used herein includes assigning, allocating, apportioning, allotting, ascribing to or associating in any way.

The singular terms "a" and "an" should not be taken to mean "one and only one". Rather, they should be taken to mean "at least one" or "one or more" unless stated otherwise.

The word "comprising" and its derivatives including "comprises" and "comprise" include each of the stated features, but does not exclude the inclusion of one or more further features.

The above implementations have been described by way of example only, and the described implementations are to be considered in all respects only as illustrative and not restrictive. It will be appreciated that variations of the described implementations may be made without departing from the scope of the invention. It will also be apparent that there are many variations that have not been described, but that fall within the scope of the appended claims.

Aspects and features of the present disclosure are set forth in the following numbered clauses.

1. A computer-implemented method for performing by a node of a network of nodes for maintaining at least part of a distributed ledger maintained by the network of nodes, the method comprising:
   assigning, during a verification procedure, an event state to a received intended record, wherein the intended record comprises a record intended for the distributed ledger.

2. A computer-implemented method for performing by a node of a network of nodes for maintaining at least part of a distributed ledger maintained by the network of nodes, the method comprising:
   maintaining at least part of the distributed ledger, wherein the at least part of the distributed ledger is configured to store records and associated verification data for the records, wherein the verification data for a record identifies: (i) a sequence of nodes in the network which received the intended record during a verification procedure; and (ii) the respective event state assigned by each node of the sequence of nodes to the intended record during the verification procedure.

3. A computer-implemented method according to clause 2, wherein each node of at least a subset of the nodes of the sequence of nodes performed a check of the record of the intended record during the verification procedure.

4. A computer-implemented method for performing by a node of a network of nodes for maintaining at least part of a distributed ledger maintained by the network of nodes, the method comprising:
   storing, in the at least part of the distributed ledger maintained by the node, a record of an intended record and verification data associated with the record, wherein the verification data identifies: (i) a sequence of nodes in the network which received the intended record during a verification procedure; and (ii) the respective event state assigned by each node of the sequence of nodes to the intended record during the verification procedure.

5. A computer-implemented method for processing an intended record for a distributed ledger which is maintained by a network of nodes, the intended record comprising a record intended for the distributed ledger, the method comprising:
   initiating a verification procedure for an intended record, wherein the verification procedure comprises the intended record being sent to a sequence of nodes of the network, wherein each node of the sequence of nodes assigns a respective event state to each received intended record during the verification procedure.

6. A computer-implemented method according to clause 5, the method further comprising:
   receiving data which identifies the sequence of nodes in the network and the respective event states assigned by each node of the sequence of nodes to the intended record;
   constructing verification data which identifies: (i) the sequence of nodes in the network which received the intended record during the verification procedure; and
(ii) the respective event state assigned by each node of the sequence of nodes to the intended record during the verification procedure; and
transmitting the verification data.

7. A computer-implemented method for performing by a node of a network of nodes, wherein the network of nodes maintains a distributed ledger, the method comprising:
receiving an intended record for the distributed ledger, wherein the intended record comprises a record intended for the distributed ledger;
assigning an event state to the intended record; and
transmitting the event state for the intended record.

8. A computer-implemented method according to clause 7, further comprising:
checking the record of the intended record to confirm whether or not the node consents to the inclusion of the record in the distributed ledger;
conditional on the node consenting to the inclusion of the record in the distributed ledger, transmitting the respective event state assigned by the node for the intended record.

9. A computer-implemented method according to clause 7 or clause 8, the method further comprising:
sending the intended record to a further node in the network, wherein the further node becomes the next node in the sequence of nodes.

10. A computer-implemented method for performing by a node of a network of nodes for storing a record in at least part of a distributed ledger maintained by the network of nodes, the method comprising:
receiving verification data for an intended record, wherein the verification data identifies: (i) a sequence of nodes in the network which received the intended record during a verification procedure; and (ii) the respective event state assigned by each node of the sequence of nodes to the intended record during the verification procedure; and
storing the record of the intended record and the verification data for the record in the at least part of the distributed ledger maintained by the node.

11. A computer-implemented method according to clause 10, wherein each node of at least a subset of the nodes of the sequence of nodes performed a check of the record of the intended record during the verification procedure.

12. A computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising:
receiving an intended record, wherein the intended record comprises a record intended for the distributed ledger, wherein the record consumes a particular association of a particular item with a particular entity;
checking the at least part of the distributed ledger maintained by the node to determine whether or not the particular association of the particular item with the particular entity has been consumed by another record in the ledger; and
conditional on the node determining that the association has not been consumed by another record in the ledger, transmitting an event state assigned by the node for the intended record.

13. A computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising:
receiving a first intended record for the distributed ledger, wherein the first intended record comprises a record intended for the distributed ledger, wherein the record consumes a particular association of a particular item with a particular entity;
receiving a second intended record for the distributed ledger, wherein the second intended record comprises a record intended for the distributed ledger, wherein the record consumes a particular association of a particular item with a particular entity;
determining whether or not there is a conflict between the first intended record and the second intended record, a conflict comprising the first intended record and the second intended record each consuming the same particular association of the same particular item with the same particular entity; and
conditional on determining a conflict, rejecting at least one of the first intended record and the second intended record.

14. A computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising:
receiving, from another node in the network, a record and verification data for the record, wherein the record consumes a particular association of a particular item with a particular entity, wherein the verification data for the record identifies: (i) a sequence of nodes in the network which received the intended record during a verification procedure; and (ii) the respective event state assigned by each node of the sequence of nodes to the intended record during the verification procedure;
determining whether or not there is a conflict, a conflict existing when the particular association that has been consumed by the record is the same particular association as that consumed by a different record in the at least part of the distributed ledger maintained by the node;
conditional on there being a conflict, determining, from the event states of the verification data associated with records, the record which was first to consume the particular association and the record which was second to consume the particular association; and
updating the distributed ledger to store the record which was first to consume the particular association and to reject the record which was second to consume the particular association.

15. A computer-implemented method for performing by a first node of a network of nodes, wherein the network of nodes maintains a distributed ledger, wherein the distributed ledger comprises records, wherein each of a plurality of the records consumes a respective association of a respective item with a respective entity, the method comprising:
receiving, as part of a first verification procedure in which the sequence of nodes includes the first node, a first intended record, wherein the first intended record comprises a first record intended for the distributed ledger, wherein the first record consumes a particular association of a particular item with a particular entity;
receiving from a second node, wherein a second verification procedure is being performed in which the sequence of nodes includes the second node but not the first node, a second intended record, wherein the second intended record comprises a second record intended for the distributed ledger, wherein the second record consumes a particular association of a particular item with a particular entity;

determining whether or not there is a conflict between the first intended record and the second intended record, wherein there is a conflict when the first record and the second record each consume the same particular association of the same particular item with the same particular entity; and conditional on there being a conflict, rejecting at least one of the first intended record and the second intended record.

16. A computer-implemented method according to any of clauses 12 to 15, wherein the item comprises digital currency.

17. A computer-implemented method for verifying a record stored in a distributed ledger, wherein the distributed ledger is configured to store records and associated verification data for the records, wherein the verification data for a record identifies: (i) a sequence of nodes in the network which received the intended record during a verification procedure; and (ii) the respective event state assigned by each node of the sequence of nodes to the intended record during the verification procedure, the method comprising:

receiving a request to verify a record;

using the verification data associated with the record to contact each node in the sequence of nodes to request confirmation that a particular part of the verification data is correct; and conditional on each node of the sequence of nodes confirming that the particular part of the verification data is correct, verifying the record.

18. A computer-implemented method for performing by a node to confirm that a particular part of the verification data for a record is correct in a distributed ledger, wherein the distributed ledger is configured to store records and associated verification data for the records, wherein the verification data for a record identifies: (i) a sequence of nodes in the network which received the intended record during a verification procedure; and (ii) the respective event state assigned by each node of the sequence of nodes to the intended record during the verification procedure, the method comprising:

receiving a request to confirm that the particular part of the verification data is correct;

checking the particular part of the verification data stored in the at least part of the distributed ledger maintained by the node; and conditional on the particular part of the verification data being correct, confirming that the particular part of the verification data is correct.

19. A computer-implemented method for performing by a node of a network of nodes for maintaining at least part of a distributed ledger maintained by the network of nodes, the method comprising:

maintaining at least part of the distributed ledger, wherein the at least part of the distributed ledger is configured to store records and associated verification data for the records, wherein the verification data for a record identifies: (i) a sequence of nodes in the network which received the intended record during a verification procedure; and (ii) the respective event state assigned by each node of the sequence of nodes to the intended record during the verification procedure;

wherein unique identifiers for accounts with the ledger associate each account with a corresponding part of the ledger.

20. A computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising:

maintaining a static time value for each association, wherein the static time value is increased in dependence on the length of time that the association remains unused;

maintaining a reputation weight for the node, wherein the reputation weight for the node is increased when the node takes part in a verification procedure for an intended record that is committed to the ledger, wherein the amount that the reputation weight for the node is increased is based on an allocated share of the static time value for the association that is used up by the record of the intended record; and using the reputation weight of the nodes in the network to resolve a conflict between two records, wherein the record which underwent a verification procedure with a sequence of nodes with the lower total reputational weight is rejected.

21. A computer-implemented method according to any preceding clause, wherein the intended record comprises a record and, at least, a verification element identifying the respective event state assigned by the current node for the intended record.

22. Computer-executable instructions which, when executed on a computer, cause the computer to perform the method of any preceding clause.

23. A computer node comprising at least one computer processor and at least one computer memory, wherein the computer memory comprises computer-executable instructions which, when executed, cause the computer node to perform the method of any of clauses 1 to 21.

The invention claimed is:

1. A computer-implemented method for performing by a node of a network of nodes, wherein the network of nodes maintains a distributed ledger, wherein the distributed ledger comprises records, wherein each of a plurality of the records consumes a respective association of a respective item with a respective entity, the method comprising:

receiving, from another node in the network, a record and verification data for the record, wherein the record consumes a particular association of a particular item with a particular entity, wherein the verification data for the record identifies: (i) a sequence of nodes in the network which received the record during a verification procedure; and (ii) the respective local event state, provided using a logical clock for the respective node, assigned by each node of the sequence of nodes to the record during the verification procedure;

determining whether or not there is a conflict, a conflict existing when the particular association that has been consumed by the record is the same particular association as that consumed by a different record in the at least part of the distributed ledger maintained by the node;

conditional on there being a conflict, determining which record to reject by comparing a reputation weight of the nodes that took part in the verification procedure for each conflicting record; and updating the distributed ledger to store the record with the higher amount of associated reputation weight from its verification nodes and to reject the record with the lower amount of associated reputation weight from its verification nodes.

2. A computer-implemented method according to claim 1 wherein the item comprises digital currency.

3. Computer-executable instructions which, when executed on a computer at a node of a network of nodes, wherein the network of nodes maintains a distributed ledger, wherein the distributed ledger comprises records, wherein each of a plurality of the records consumes a respective association of a respective item with a respective entity, cause the computer to:

receive, from another node in the network, a record and verification data for the record, wherein the record consumes a particular association of a particular item with a particular entity, wherein the verification data for the record identifies: (i) a sequence of nodes in the network which received the record during a verification procedure; and (ii) the respective local event state, provided using a logical clock for the respective node, assigned by each node of the sequence of nodes to the record during the verification procedure; determine whether or not there is a conflict, a conflict existing when the particular association that has been consumed by the record is the same particular association as that consumed by a different record in the at least part of the distributed ledger maintained by the node;

conditional on there being a conflict, determine which record to reject by comparing a reputation weight of the nodes that took part in the verification procedure for each conflicting record; and update the distributed ledger to store the record with the higher amount of associated reputation weight from its verification nodes and to reject the record with the lower amount of associated reputation weight from its verification nodes.

4. A node of a network of nodes, wherein the network of nodes maintains a distributed ledger, wherein the distributed ledger comprises records, wherein each of a plurality of the records consumes a respective association of a respective item with a respective entity, the node comprising at least one computer processor and at least one computer memory, wherein the computer memory comprises computer-executable instructions which, when executed, cause the node to:

receive, from another node in the network, a record and verification data for the record, wherein the record consumes a particular association of a particular item with a particular entity, wherein the verification data for the record identifies: (i) a sequence of nodes in the network which received the record during a verification procedure; and (ii) the respective local event state, provided using a logical clock for the respective node, assigned by each node of the sequence of nodes to the record during the verification procedure;

determine whether or not there is a conflict, a conflict existing when the particular association that has been consumed by the record is the same particular association as that consumed by a different record in the at least part of the distributed ledger maintained by the node;

conditional on there being a conflict, determine which record to reject by comparing a reputation weight of the nodes that took part in the verification procedure for each conflicting record; and update the distributed ledger to store the record with the higher amount of associated reputation weight from its verification nodes and to reject the record with the lower amount of associated reputation weight from its verification nodes.

5. Computer-executable instructions according to claim 3 wherein the item comprises digital currency.

6. A node according to claim 4 wherein the item comprises digital currency.

* * * * *